(12) United States Patent
Takahashi

(10) Patent No.: US 9,137,271 B2
(45) Date of Patent: *Sep. 15, 2015

(54) SYSTEM FOR SWITCHING BETWEEN COMMUNICATION DEVICES, SWITCHING METHOD, AND SWITCHING PROGRAM

(71) Applicant: Masahiko Takahashi, Tokyo (JP)

(72) Inventor: Masahiko Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 13/762,728

(22) Filed: Feb. 8, 2013

(65) Prior Publication Data

US 2013/0208723 A1  Aug. 15, 2013

Related U.S. Application Data

(62) Division of application No. 11/915,086, filed as application No. PCT/JP2006/309503 on May 11, 2006, now Pat. No. 8,396,062.

(30) Foreign Application Priority Data

May 24, 2005  (JP) ................................ 2005-150903
Nov. 28, 2005  (JP) ................................ 2005-341993

(51) Int. Cl.
*H04L 12/56*  (2006.01)
*H04L 29/06*  (2006.01)
(Continued)

(52) U.S. Cl.
CPC ...... *H04L 65/1086* (2013.01); *H04L 29/12009* (2013.01); *H04L 29/12452* (2013.01);
(Continued)

(58) Field of Classification Search
CPC .................... H04L 29/12009; H04L 65/1069; H04L 65/1086
See application file for complete search history.

(56) References Cited

U.S. PATENT DOCUMENTS 5,774,660 A     6/1998  Brendel et al.
5,920,701 A *   7/1999  Miller et al. .................. 709/228
(Continued)

FOREIGN PATENT DOCUMENTS

JP       11-355302 A     12/1999
JP     2002-185464 A      6/2002
(Continued)

OTHER PUBLICATIONS

Notification of Reasons for Refusal dated Feb. 7, 2012 issued by the Japanese Patent Office in corresponding Japanese Application No. 2007-517770.

(Continued)

*Primary Examiner* — Ayaz Sheikh
*Assistant Examiner* — Hai-Chang Hsiung
(74) *Attorney, Agent, or Firm* — Sughrue Mion, PLLC

(57) ABSTRACT

A switching system in which a unique additional address is used for each session, and session information is transferred as it is without rewriting the session information when a communication device such as a server is switched, a switching method, and a switching program are disclosed. The switching system comprises a switching device (210) for selecting an address for each session from a first communication device, attaching the address to a packet from the first communication device in place of a destination address of the packet, and sending the packet, a dispatcher (240) for setting up a session with the first communication device, selecting a server to deal with the request from the first communication device, and transferring the set up session to a second communication device, and servers (250-1, ..., 250-n) for taking over the session transferred by the dispatcher and dealing with the request from the first communication device.

2 Claims, 23 Drawing Sheets

(51) Int. Cl.
  *H04L 29/12* (2006.01)
  *H04L 29/08* (2006.01)
  *H04L 12/931* (2013.01)
  *H04L 12/947* (2013.01)

(52) U.S. Cl.
  CPC ........ *H04L29/12924* (2013.01); *H04L 49/256* (2013.01); *H04L 49/60* (2013.01); *H04L 61/2546* (2013.01); *H04L 61/6063* (2013.01); *H04L 65/1069* (2013.01); *H04L 67/1002* (2013.01); *H04L 67/1014* (2013.01); *H04L 67/1023* (2013.01); *H04L 67/1027* (2013.01); *H04L 67/14* (2013.01)

(56) References Cited

U.S. PATENT DOCUMENTS

| | | | |
|---|---|---|---|
| 7,088,727 | B1 | 8/2006 | Short et al. |
| 7,310,671 | B1* | 12/2007 | Hassell et al. ............... 709/225 |
| 7,359,380 | B1* | 4/2008 | Maufer et al. ............... 370/392 |
| 8,396,062 | B2* | 3/2013 | Takahashi ..................... 370/392 |
| 2002/0188730 | A1* | 12/2002 | Tang et al. .................... 709/227 |
| 2003/0009561 | A1* | 1/2003 | Sollee ............................ 709/227 |
| 2003/0086390 | A1* | 5/2003 | Eschbach et al. ............ 370/329 |
| 2003/0149789 | A1 | 8/2003 | Hoffmann |
| 2006/0009232 | A1 | 1/2006 | Vakil et al. |

FOREIGN PATENT DOCUMENTS

| | | |
|---|---|---|
| JP | 2004004167 A | 1/2004 |
| JP | 2005-57461 A | 3/2005 |
| JP | 2005339201 A | 12/2005 |

OTHER PUBLICATIONS

Yamai, et al: "A Design and Implementation of Load Balancing Mechanism at Command Level on UNIX", The Transactions of the Institute of Electronics, Information and Communication Engineers, Japan, Jul. 25, 1994, No. 271, pp. 483-492.

Office action issued Jul. 3, 2012 by the Japanese Patent Office in counterpart Japanese Application No. 2007-517770.

Takahashi, et al., "Data Center Kankyo ni Tekishita TCP Musetsudan Process Migration no Jitsugen (Implementation of Process Migration with TCP Session Continuity suitable for Data Center Environments)", Information Processing Society of Japan Kenkyu Hokoku 2004-OS-96, Jun. 17, 2004, pp. 29-36, vol. 2004, No. 63.

Maltz, et al., "TCP Splicing for Application Layer Proxy Performance", IBM Research Report, Mar. 17, 1998, pp. 1-17, RC 21139.

Yamai, et al: "A Design and Implementation of Load Balancing Mechanism at Command Level on UNIX", The Transactions of the Institute of Electronics, Information and Communication Engineers, Japan, Jul. 25, 1994, No. 271.

* cited by examiner

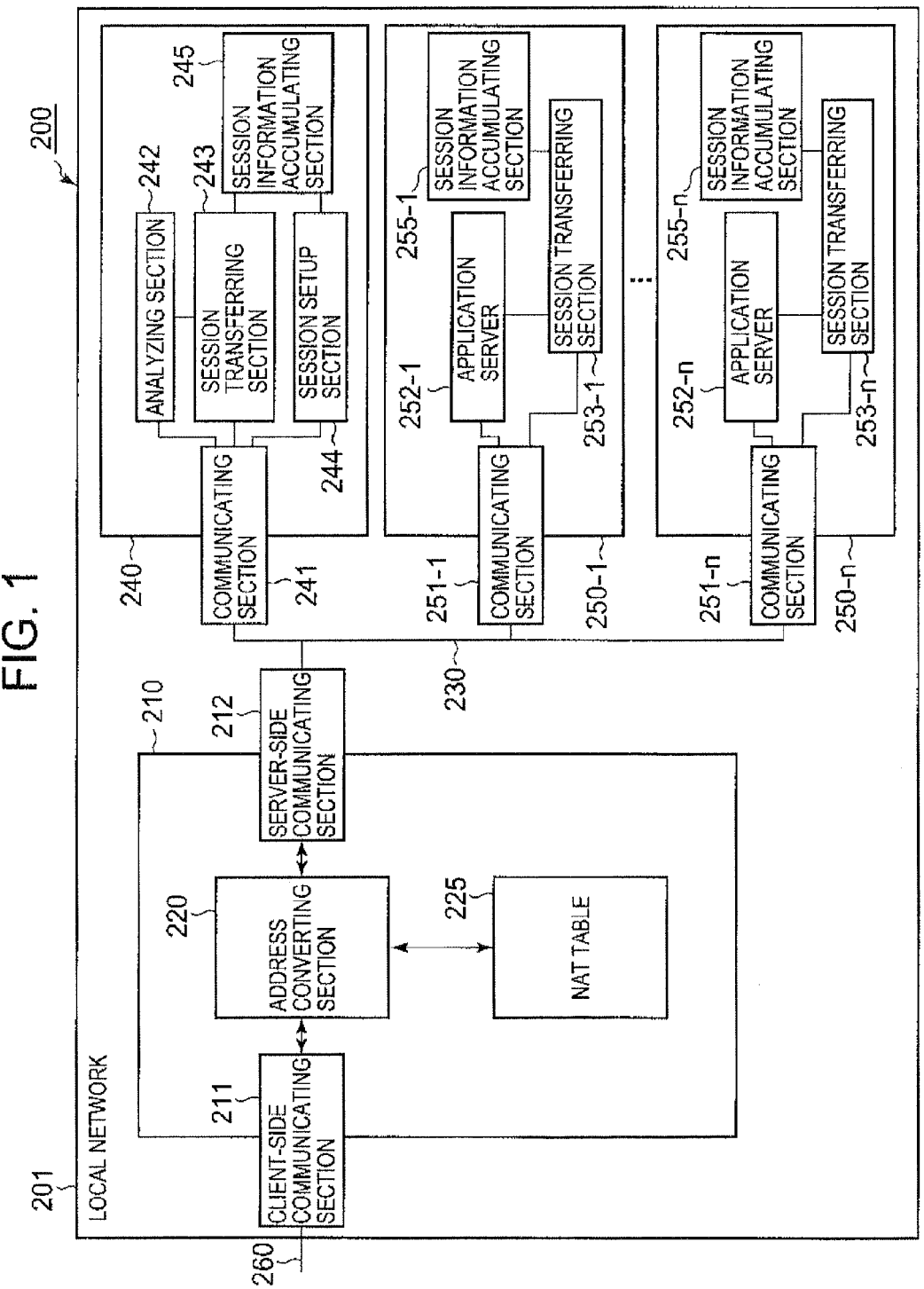

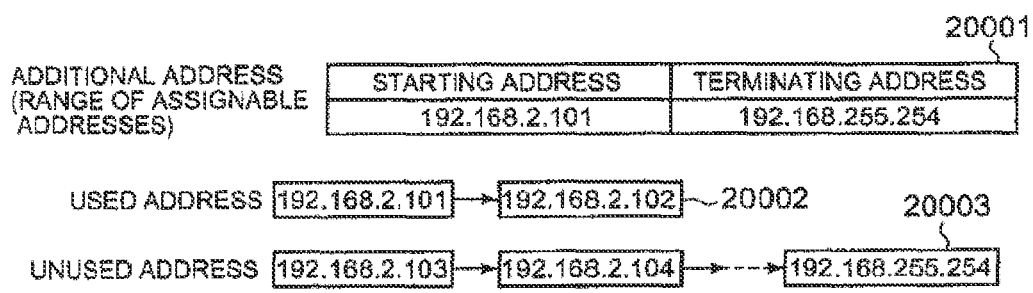

FIG. 10A

| CLIENT ADDRESS | CLIENT PORT NUMBER | CONVERTING ADDRESS | FIN ATTRIBUTE (DOWNWARD) | FIN ATTRIBUTE (UPWARD) |
|---|---|---|---|---|
| 10.10.10.10 | 10001 | 192.168.2.100 | 0 | 0 |
| 20.20.20.20 | 20001 | 192.168.2.101 | 0 | 0 |
| 30.30.30.30 | 30002 | 192.168.2.102 | 0 | 0 |

FIG. 10B

| CLIENT ADDRESS | CLIENT PORT NUMBER | CONVERTING ADDRESS | FIN ATTRIBUTE (DOWNWARD) | FIN ATTRIBUTE (UPWARD) |
|---|---|---|---|---|
| 10.10.10.10 | 10001 | 192.168.2.100 | 0 | 0 |
| 20.20.20.20 | 20001 | 192.168.2.101 | 0 | 0 |
| 30.30.30.30 | 30002 | 192.168.2.102 | 0 | 0 |
| 60.60.60.60 | 10005 | 192.168.2.103 | 0 | 0 |

FIG. 10C

| CLIENT ADDRESS | CLIENT PORT NUMBER | CONVERTING ADDRESS | FIN ATTRIBUTE (DOWNWARD) | FIN ATTRIBUTE (UPWARD) |
|---|---|---|---|---|
| 10.10.10.10 | 10001 | 192.168.2.100 | 0 | 0 |
| 20.20.20.20 | 20001 | 192.168.2.101 | 0 | 0 |
| 30.30.30.30 | 30002 | 192.168.2.102 | 0 | 0 |
| 60.60.60.60 | 10005 | 192.168.2.103 | 1 | 0 |

FIG. 10D

| CLIENT ADDRESS | CLIENT PORT NUMBER | CONVERTING ADDRESS | FIN ATTRIBUTE (DOWNWARD) | FIN ATTRIBUTE (UPWARD) |
|---|---|---|---|---|
| 10.10.10.10 | 10001 | 192.168.2.100 | 0 | 0 |
| 20.20.20.20 | 20001 | 192.168.2.101 | 0 | 0 |
| 30.30.30.30 | 30002 | 192.168.2.102 | 0 | 0 |
| 60.60.60.60 | 10005 | 192.168.2.103 | 1 | 1 |

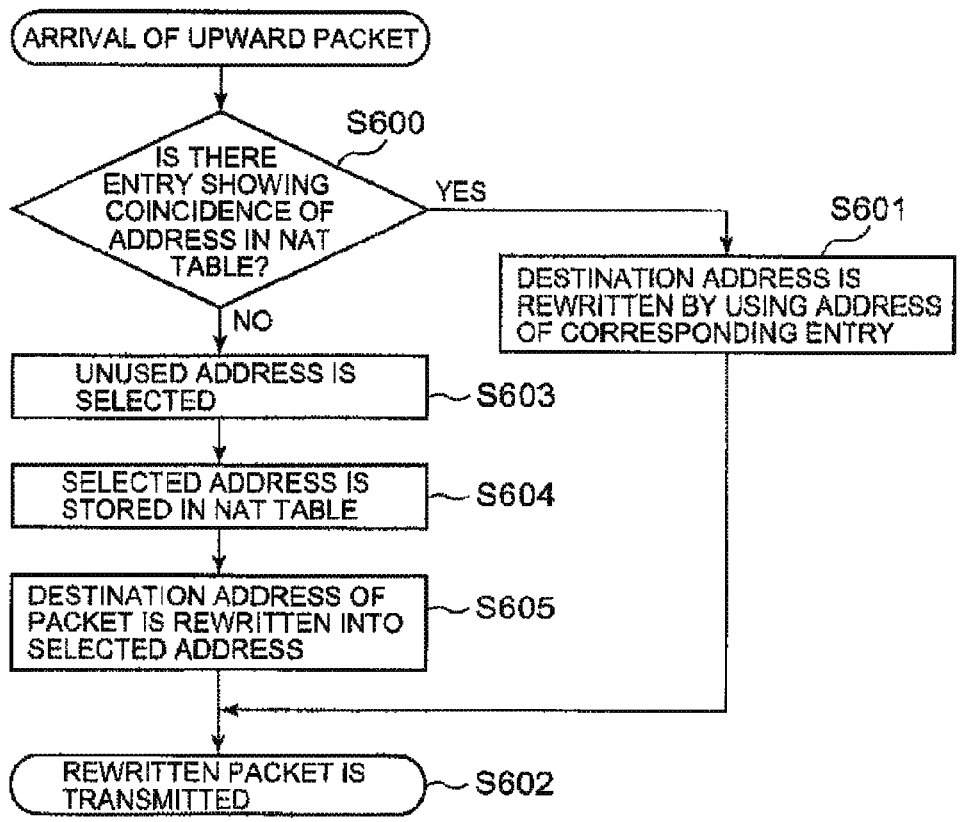

FIG. 20

| CLIENT ADDRESS | CLIENT PORT NUMBER | SERVER SWITCHING DEVICE PORT NUMBER | SERVER ADDRESS | ADDED VALUE IN SERVER DIRECTION | ADDED VALUE IN CLIENT DIRECTION |
|---|---|---|---|---|---|
| 70.70.70.70 | 10005 | 20003 | 192.168.1.100 | 40000 | -50000 |

2001
2002

SYSTEM FOR SWITCHING BETWEEN COMMUNICATION DEVICES, SWITCHING METHOD, AND SWITCHING PROGRAM

CROSS REFERENCE TO RELATED APPLICATIONS

This application is a divisional of U.S. patent application Ser. No. 11/915,086, filed on Nov. 20, 2007, which is a National Stage of International Application No. PCT/JP2006/309503, filed on May 11, 2006, which claims priority from Japanese Patent Application Nos. 2005-150903, filed on May 24, 2005 and 2005-341993, filed on Nov. 28, 2005, the contents of all of which are incorporated herein by reference in their entirety.

TECHNICAL FIELD

The present invention relates to a switching system, switching method, and switching program between communication devices and more particularly to the switching system, switching method, and switching program to logically perform switching of a session between communication devices such as session switching between a client and a server by management of a simple address conversion table and by less times of packet rewriting processes.

BACKGROUND TECHNOLOGY

Ordinarily, each of communication devices such as a server, client or a like connected to a network has a network address (hereinafter simply called an "address"). A communication device sets up a session with an address of a device of a party to be communicated with and carries out communication by sending or receiving a packet via the session.

It is not always necessary that an address assigned to each of communication devices is an address in one specified layer. For example, an address in a layer stacked directly above a lower layer can be mapped to an address in the lower layer. That is, for example, an IP (Internet Protocol) address in network layer can be mapped to a MAC (Media Access Control) address in data link layer. Also, a plurality of port numbers in transport layer can be mapped to one IP address. In communication devices, a packet can be received or transmitted by using an address assigned in any one of layers or its mapped address.

For example, in communication in the same domain (subnet), a communication device issues an ARP (Address Resolution Protocol) request for an IP address assigned to a communication device of a party to be communicated with. The communication device having the IP address returns a MAC address in response to the ARP request. The communication device having received the MAC address transmits a packet to the returned MAC address. Thus, by using the mapping of addresses in two layers, receipt and transmission of a packet between communication devices can be realized.

Although, in the descriptions below, for convenience of explanation, unless otherwise defined, an address denotes an IP address, the address is not limited only to IP address. Though the explanation is made assuming that communication is carried out between communication devices by using TCP (Transmission Control Protocol) as a communication protocol, there is no restriction on any protocol to be used between communication devices.

Next, operations of setting up a session between communication devices using the TCP are described briefly.

A communication device transmits a request for new connection to a communication device being a party to be communicated with to set up a bidirectional communication session. After that, via the session, data is transmitted and received between communication devices. The request for new connection using, for example, TCP begins with transmission of a SYN (Synchronized) packet. Then, a session is set up by operations referred to as a so-called "3-way handshake" process. At the time of setting up the session, an initial value of a sequence number is notified to each other between communication devices. When a communication device transmits a packet, sequence number of the packet is calculated by adding the initial value to a value corresponding to an amount of data of packets having been already transmitted. A receiver of the packet can check whether or not the packet has been received without a loss by confirming the sequence number of the received packet.

Next, a conventional switching device is described.

A communication system provided with the conventional switching system of this type is disclosed in Technical Reference 1 (F5 Network Japan, "BIG-IP Load Balancer 520" [online] and Internet:<URL,http://www.f5network.co.jp/ja/products/load index.Html>).

FIG. 18 is a block diagram showing a connection configuration of a conventional communication system provided with the switching device disclosed in the above Technical Reference 1. The communication system includes a switching device 121 connected in a local network 120, a plurality of servers 130-1~130-n, a plurality of clients 100-1~100-m, and a network 110 serving as a packet exchange network to connect the local network 120 to the clients 100-1~100-m.

The switching operations of the server by the conventional switching device 121 are described by referring to the connection configuration shown in FIG. 18 and also to FIG. 19 which is a sequence diagram showing operations of server switching by the conventional switching device. The client (hereinafter, explained by using the client 100-1, address 70.70.70.70 in FIG. 19) sets up a session with the switching device having system address (80.80.80.80 in FIG. 19) being a destination representing a plurality of servers 130-1~130-n.

The switching device 121 in the local network 120 performs load balancing on servers by dispatching requests to the servers 130-1~130-n. The switching device 121, when receiving a request for setting up a session from the client 100-1, sets up a session between the client 100-1 and switching device 121 in accordance with the 3-way handshake procedure (packets 1901, 1902, and not-shown ACK packet between 1902 and 1903 transmitted from the client 100-1 to the switching device 121 in FIG. 19). Then, a request to the server is transmitted from the client 100-1 to the switching device 121 (1903 in FIG. 19).

The switching device 121 selects a server from the plurality of servers according to some selecting criteria and dispatches a request from the client 100-1. The server may be selected by using the information used for communication control such as a source address or a like written in a header part of a packet as a criterion or by using the application level information contained in a payload part of a packet as a criterion. Although flexible dispatch of requests to servers is made possible in a unit of a session by using the application level information, the processing load on the switching device 121 becomes higher. Servers may be selected according to a round robin method by which requests are dispatched to different servers in order of arrival of the requests.

It is now assumed that the server 130-1 is selected by the switching device 121 as a server to which a request from the client 100-1 is dispatched.

The switching device 121 sets up a session between the switching device 121 and the server 130-1 according to the 3-way handshake procedure (in FIG. 19, packets 1904, 1905, and not-shown ACK packet between 1905 and 1906 transmitted from the switching device 121 to the server 130-1). Then, a request to a server is transmitted from the switching device 121 to the server 130-1 (1906 in FIG. 19).

The header part of a packet has header information including a destination address, destination port number, source address, source port number, communication protocol type, sequence number, and number of bytes (size) of a packet. Moreover, in FIG. 19, the port number, communication protocol type are not required for explanation of operations and, therefore, their descriptions are omitted accordingly. Though an ACK packet notifying a sequence number of the received packet is also transmitted, which causes drawings to be complicated and its description is omitted accordingly.

As shown in FIG. 19, the switching device 121, when dispatching a packet received from the client 100-1 at the sequence 1904 and thereafter, rewrites its destination address (in some cases, simply shown as "Dst" in drawings and hereinafter), its source address (in some cases, simply shown as "Src"), and its sequence number, all which are written on the header part of the packet and sends out the packet having the rewritten addresses, sequence number, or a like to the server 130-1.

More specifically, as shown in FIG. 19, the switching device 121 rewrites the Src of the header part of a packet from 70.70.70.70 (address of client 100-1) into 192.168.1.99 (address assigned to the switching device 121 in the local network 120). The Dst is also rewritten from 80.80.80.80 (system address representing the server 130-1~130-*n*) into 192.168.1.100 (address of the selected server 130-1).

Hereinafter, operations of rewriting a sequence number in the switching device 121 are described.

A sequence number of a packet is determined for every session in a every transmitting direction of the session. A sequence number of a SYN packet (10000 shown in 1901 in FIG. 19) in setting up a session and a sequence number (30000 shown in 1902 in FIG. 19) of a SYN-ACK packet (1902 in FIG. 19) in response to the SYN packet are determined as initial values for their own direction and, thereafter, a value obtained by adding a size of a packet to the sequence numbers is attached as the sequence number to the packet for their own direction. In the case of a packet containing an SYN and of a FIN packet showing the termination of a session, even if its size is 0, the addition of one to the sequence number is stipulated in the TCP/IP protocol.

Similarly, for a session between the switching device 121 and the server 130-1, an initial value of a sequence number in a direction from the switching device 121 to the server 130-1 is determined (50000 shown in 1904 in FIG. 19) and an initial value of a sequence number in a direction from the server 130-1 to the switching device 121 is determined (80000 shown in 1905 in FIG. 19).

The switching device 121 stores a difference between an initial value in the direction from the switching device 121 to the server 130-1 and an initial value in the direction from the client 100-1 to the switching device 121. In the example in FIG. 19, the number 40000 being a difference between 50000 and 10000 is stored. Then, when the switching device 121 relays a packet following the packet 1903 in FIG. 19 having received from the client 100-1 and transmits the relayed packet to the server 130-1, the sequence number to be attached to the packet received from the client 100-1 is rewritten into a value obtained by adding the difference to the sequence number.

Similarly, the switching device 121 stores a difference between an initial value in the direction from the switching device 121 to the client 100-1 and an initial value in the direction from the server 130-1 to the switching device 121. In the example in FIG. 19, the number −50000 being a difference between 30000 and 80000 is stored. Then, when the switching device 121 relays a packet following the packet 1907 in FIG. 19 having received from the server 130-1 and transmits the relayed packet to the client 100-1, the sequence number attached to the packet received from the server 130-1 is rewritten into a value obtained by adding the difference to the sequence number.

The switching device 121 having received a response packet (1907 and 1909 in FIG. 19) from the selected server 130-1, transmits the packet, with rewriting its Src, Dst, and sequence number in the header information, to the client 100-1 (1908, 1910 in FIG. 19). The server 130-1, after having completed the transmission of all response packets, attaches a termination flag (FIN) for terminating a session to a packet and transmits the packet (1911 in FIG. 19). In response to this process, a packet having the FIN flag is transmitted from the switching device 121 to the server 130-1 (1912 in FIG. 19).

Further, the switching device 121 transmits a packet having a FIN flag (1913 in FIG. 19) to the client 100-1. The packet having the FIN flag (1914 in FIG. 19) is transmitted from the client 100-1 having received the packet having the FIN flag. Thus, the session between the client 100-1 and switching device 121 and the session between the switching device 121 and the server 130-1 are terminated.

As described above, in the conventional switching device, communication is established between a client and a server by setting up a session independently between the client and a switching device and between the switching device and the server and by rewriting header information of each packet in each session and relaying each packet so that the two sessions are seen logically as one session. The method for logically setting up a session by rewriting header information of a packet as described above is disclosed in Technical Reference 2 (David Malts et al., "TCP Splicing for Application Layer Proxy Performance" IBM Research Report, RC21139).

To rewrite the above header information, table management of NAT (Network Address Translator) information as shown in FIG. 20 is required. Specifically, it is necessary to include, in a field in the table, the information about a system address representing each of the servers 130-1~130-*n* and, even when a number of each address in a local network assigned to the switching device is only one, as shown on the line 2001 in the table in FIG. 20, at least, the information about an address of a client (client address), port number of a client (client port number), port number on the switching device side between a switching device and a server (switching device port number), an address of a server to which a request is dispatched, a difference (value to be added in a direction to a server) in sequence number values to be added when a packet of a client is relayed to a server, and a difference (value to be added in a direction to a client) in sequence number values to be added when a packet is relayed from a server to a client. For example, when operations shown in FIG. 19 are performed, a value as described on the line 2002 in the table shown in FIG. 20 is stored as a field value for each field. A client address and client port number are information required for the switching device to identify a session between a client and switching device and a switching device port number are information required for the switching device to identify a session between the switching device and server.

When a new request is issued, a server is again selected and an entry is added to the table in FIG. 20 and, when a session is terminated, a corresponding entry 20 is deleted from the table in FIG. 20.

The first problem of the above conventional technology is that the management of the NAT table for address conversion is complicated.

In the conventional server switching, an address is assigned to a server in a fixed manner and, therefore, when a server is switched, a process of replacing an address of a packet with another address is required. Due to this, whenever a server is switched without terminating the session, an address of an entry in the NAT table has to be changed. Additionally, when a sequence number used to manage the order of transmitting a packet is rewritten, it is necessary that information to be used for the rewriting is to be stored in the NAT table for the management.

The second problem is that load of rewriting a header of a packet is high. That is, in the conventional device, rewriting of a source address, destination address, sequence number of a packet, and other many values is required before transmission of the packet.

Therefore, an object of the present invention is to simplify the management of the NAT table required to switch communication devices such as a server.

Also, another object of the present invention is to decrease processes of rewriting a packet and to provide a server switching device having high efficiency.

DISCLOSURE OF THE INVENTION

To solve the above problems, according to the first aspect of the present invention, a switching system is provided which includes a switching device to select an address each time a session is set up by a client and to rewrite a destination address of a packet transmitted from a client into the selected address for transmission, a dispatcher to set up a session with a client and to select a server used to process a request from the client and sends a set up session to the selected server, and a server to take over the session transferred from the dispatcher and to process the request from the client.

The present invention provides, in addition to the switching system described in the above first aspect, as stated in the Claims, many aspects related to a switching device, dispatcher, server, switching method, and switching program.

The first effect being achievable by these aspects is that no renewing of the NAT table held by the switching device is required when a server is rewritten. A packet is transmitted not to a device having a specified fixed address assigned to a server in a fixed manner but to a device having an address selected for every session. Since a session is switched together with an address, even if a server to be connected by a client is switched, the address of a device to which a packet is transmitted remains unchanged. By this, the first effect is realized.

The second effect of the present invention is that no rewriting of session information containing a sequence number used by the switching device is required and the lower loads of rewriting a packet is achieved. A session is set up between a client and a dispatcher and, therefore, the management of states of a session by the switching device is not necessary.

Since the objects described above, many other objects, aspects, advantages of the present invention are described in the following embodiments in accordance with principles of the present invention with reference to drawings can be readily appreciated by those skilled in the art.

BRIEF DESCRIPTION OF DRAWINGS

FIG. 1 is a block diagram showing configurations of a switching system of the first embodiment of the present invention.

FIG. 2 is a block diagram showing an address managing method according to the first embodiment of the present invention.

FIG. 3 is a diagram showing an address converting table (NAT table) according to the first embodiment of the present invention.

FIG. 10A shows a change of a state of the NAT table of the switching device according to the first embodiment of the present invention.

FIG. 10B shows a change of a state of the NAT table of the switching device according to the first embodiment of the present invention FIG. 10C shows a change of a state of the NAT table of the switching device according to the first embodiment of the present invention.

FIG. 10D shows a change of a state of the NAT table of the switching device according to the first embodiment of the present invention.

FIG. 11 is a diagram of a NAT table according to a second embodiment of the present invention.

FIG. 12 is a flow chart representing a flow to process a packet received from a client in the address converting section according to the second embodiment of the present invention.

FIG. 20 is a diagram showing a conventional NAT table.

BEST MODE FOR CARRYING OUT THE INVENTION

Figure 4:
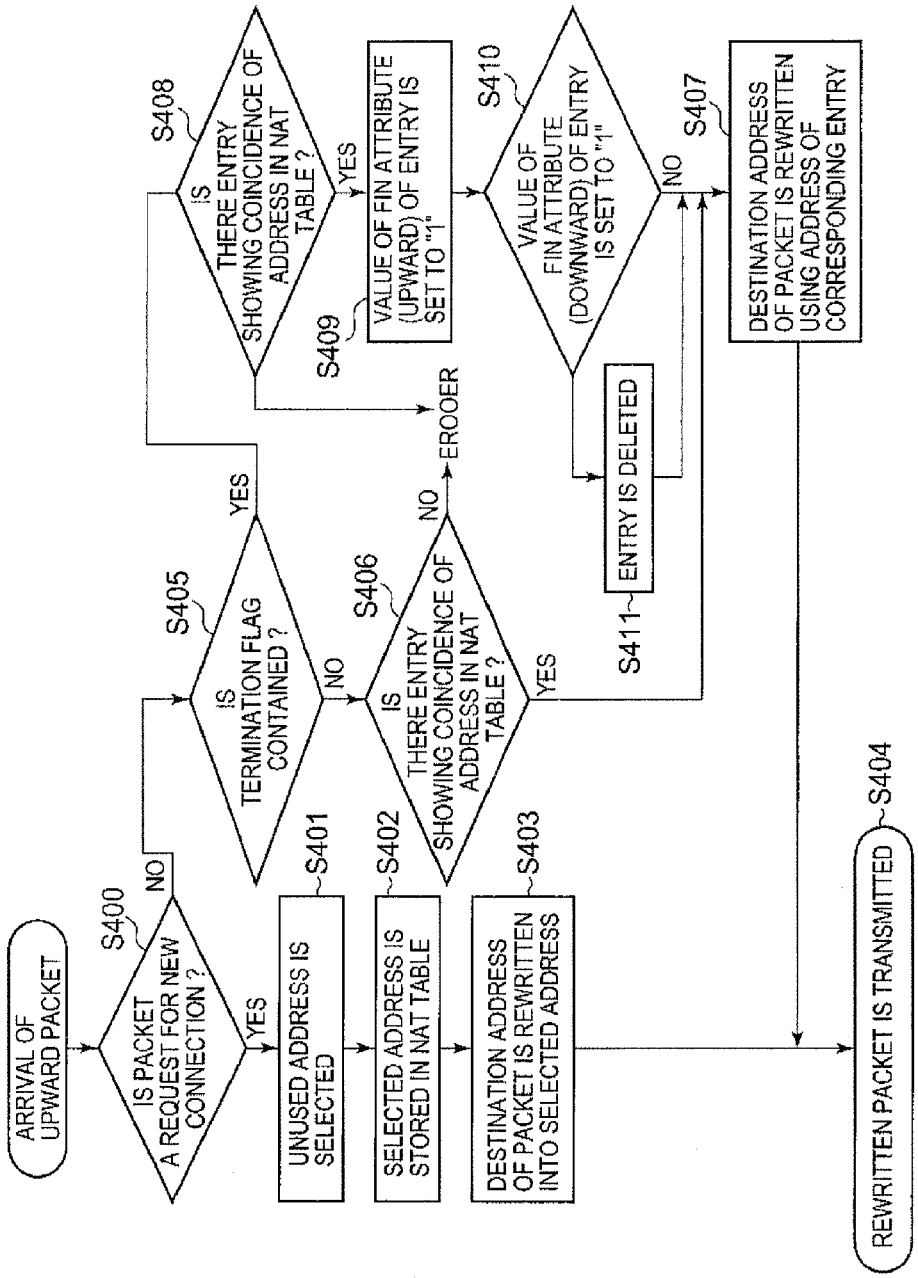
FIG. 4 is a flow chart showing operations of address conversion performed when a switching device sends out a packet received from a client to a network according to the first embodiment of the present invention.

Hereinafter, some preferred embodiments of the present invention are described in detail with reference to the attached drawings.

First Embodiment

Next, the first embodiment of the present invention is explained in detail by referring to FIGS. 1 to 10.

FIG. 1 is a block diagram showing configurations of a switching system of the first embodiment of the present invention. As shown in FIG. 1, the switching system 200 of the first embodiment of the present invention includes a switching device 210, a dispatcher 240 to set up a session with a client at the start and to transfer the setup session to servers, one or more servers 250-1 to 250-n, and a network 230 to connect the switching device 210, dispatcher 240, and servers 250-1 to 250-n to one another. Although only one dispatcher 240 is shown in FIG. 1, a plurality of dispatchers may be provided. Also, in FIG. 1, though the dispatcher 240 is disposed outside of the switching device 210, the dispatcher 240 and switching device 210 may be integrally mounted. Moreover, the network 230 is connected further to clients (not shown).

According to the present invention, addresses dealt in the local network 201 are divided into two addresses, one being fixed addresses and the other being additional addresses. One fixed address is assigned to each of the switching device 210, dispatcher 240, and servers 250-1 to 250-n and is set to a communicating section of each of the devices. The number of additional addresses falls within a range permitted in the local network environment. One additional address is selected out of addresses managed as unused addresses described later every time when a request for new connection of a session is made by a client. The additional address is assigned to the dispatcher 240 or to any one of the servers 250-1 to 250-n and is set to the communicating section of each of the devices. Therefore, depending on situations, there is a possibility that both one fixed address and a plurality of additional addresses are assigned to the dispatcher or each of the servers 250-1 to 250-n.

The switching device 210 includes at least a client-side communicating section 211, a server-side communicating section 212, an address converting section 220, and a NAT (Network Address Translator) table 225.

The client-side communicating section 211 is a given communicating means connected to a network 260 and to be used for communication with a client. A unique fixed address is assigned to the client-side communicating section 211 to be used in the network 260. This fixed address is hereinafter called a "system address".

The server-side communicating section 212 is a given communicating means connected to the network 230 and to be used for communication with the dispatcher 240 and servers 250-1 to 250-n. A fixed address is assigned to the server-side communicating section 212 to be used in the local network 201. This fixed address is a unique address to be used within the local network 201.

The address converting section 220 is a section to make conversions among system addresses and addresses in the local network 201. That is, the address converting section 220 rewrites a destination address written in a header of a packet transmitted from a client to the dispatcher 240 or any one of the servers 250-1 to 250-n and a source address written in a header of a packet transmitted from the dispatcher 240 or any one of the servers 250-1 to 250-n to a client 100. Unlike in the case of conventional switching devices, no rewriting of a sequence number is required.

The NAT table 225 is a table to store the correspondence between an address of each of clients and an address used in a local network 201 and their states for mutual address conversion to be made in the address converting section 220 for every session. The NAT table 225 needs to contain, at least, an address of a client (client address), port number of a client (client port number), address to be rewritten when a packet is sent to the network 230 (converting address), as a field, in such a manner to be indicated on the line of 301 in the table shown in FIG. 3.

The NAT table also have a FIN attribute (upward) being a field representing maintenance or termination of a session in a direction from a client toward a server and a FIN attribute (downward) being a field representing maintenance or termination of a session in a direction from a server toward a client. The FIN attribute (upward) and FIN attribute (downward) are attributes representing the termination of a session. In bidirectional communication, declaration of the termination of a session for each direction is possible and, therefore, by making the FIN attribute have two attributes, one in an upward direction and another in a downward direction, management of the state of a session between a client and a server is made possible. When session termination is declared from a client side, the FIN attribute (upward) value is set to "1" and when the session termination is declared from a local network side, the FIN attribute (downward) value is set to "1". In either case, its initial value is 0. When both the attribute values become "1", the entry is deleted by the address converting section 220.

Unlike in the case of the conventional switching device, the use of a port number (switching device port number) on a switching device side between the switching device and server, a differential (value to be added in a server direction) of a sequence number value to be added when a client packet is relayed to a server, and a differential (value to be added in a client direction) of a sequence number value to be added when a packet from a server is relayed to a client is not necessary.

Next, operations of address conversion of the first embodiment are described.

FIG. 4 is a flow chart showing operations of address conversion performed when the switching device 210 sends out a packet received from a client to the network 230. Hereinafter, by referring to FIG. 4, operations of the address converting section 220 are described. The switching device 210 of the first embodiment is not aware of which server a request is assigned to and, as explained hereinafter, the switching device 210 simply rewrites an address and sends out a packet to the network 230. Therefore, unlike in the case of the conventional switching device, instead of expression of "a packet is sent out to a server", the expression of "a packet is sent out to a network" is used.

Figure 19:
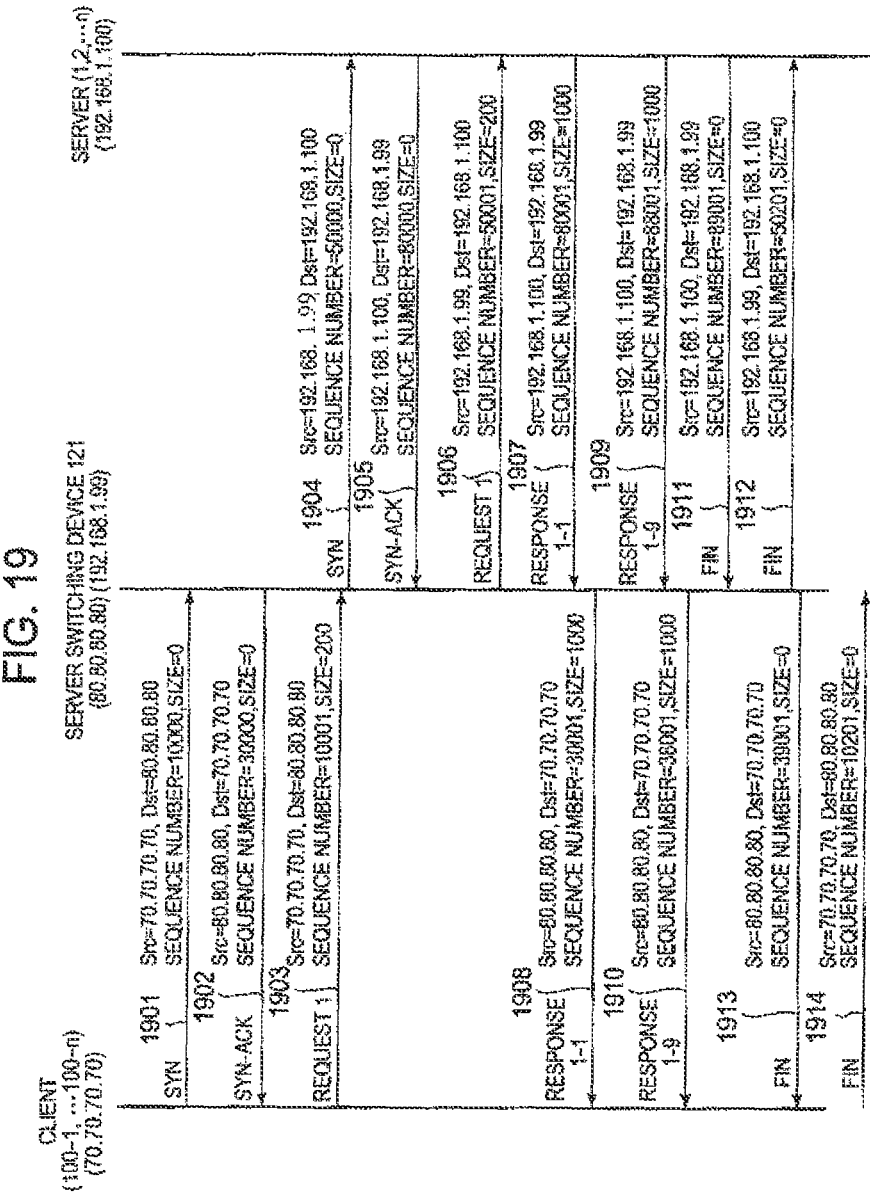
FIG. 19 is a sequence diagram showing operations of server switching by the conventional switching device.

First, operations of the address converting section 220 performed when a packet having a request for new session made by a client to set up a session at the start, which corresponds to the "SYN" (synchronized) packet shown in the conventional example of FIG. 19 as 1901, is transmitted using a system address as a destination are described. The switching device 210 having received a packet from the client-side communicating section 211 judges whether or not the received packet is a packet of a request for new session and, if the packet is the new session request ("Yes" in step S400), selects one of unused addresses (that is, an additional address not being used for current communication) that is not being used in an entry in the NAT table 225 out of addresses able to be used as an additional address (Step S401).

Any given conventional selection algorithm can be used as a selection algorithm. As shown in FIG. 2, for example, a method is available by which unused addresses are managed in a list form. It is now assumed that a range of addresses to be allowed to be assigned to requests from a client is as shown by the address list 20001 shown in FIG. 2. Addresses that can be used as server addresses in an entry in the NAT table 225 are managed by using the current address list like the 20002 and addresses falling within the range shown in the 20001 list and not now being used are managed by using the unused address list like the 20003 list. In Step S401, one address is selected from the unused address list 20003 and is added to the currently-used address list 20002. Then, for the selected address to be added as a converting address, an entry is newly created in the NAT table 225 (Step S402). At this time point, an address of a client and a port number are written as a field value in the entry. Values of both the FIN attribute (upward) and FIN attribute (downward) are initialized to "0".

A destination address of a packet is rewritten into an unused address (hereinafter a "converting address") (Step S403) and the packet having the rewritten address is sent out from the server-side communicating section 212 to the network 230 (Step S404).

Next, operations performed when the switching device 210 receives the packet transmitted from a client after a session has been set up and rewrites the destination address of the packet into a converting address to send out the packet with the rewritten address to the network 230 are described. First, communication by packets with no termination flag is explained.

First, whether or not the packet is a request for new session is judged ("No" in the Step S400). Then, whether or not a termination flag (FIN) is contained in the packet is judged ("No" in the Step S405). Next, whether or not there is the coincidence between a source address and source port of the transmitted packet and a client address in an entry and client number in the NAT table is checked (Step S406). If there is no coincidence of addresses in any entry in the NAT table ("No" in Step S406), the case is judged as the occurrence of an error and processing of discarding the transmitted packet or the like is performed. If there is coincidence of addresses in an entry in the NAT table ("Yes" in the Step S406), the destination address of the packet is rewritten into a converting address (Step S407). The packet is then transmitted to the local network 201 (Step S404).

Further, by referring to FIG. 4, the flow of processes performed by the switching device 210 to terminate a session between a client and the dispatcher 240 or server 250-1 after the ending of data communication are described.

First, whether or not the packet is a request for new session is judged ("No" in the Step S400). Then, whether or not a termination flag (FIN) is contained in the packet is judged ("Yes" in the Step S405). Next, whether or not there is coincidence between a source address and source port of the transmitted packet and a client address and client number in an entry in the NAT table is checked (Step S408). If there is no coincidence of addresses in any entry in the NAT table ("No" in the Step S408), the case is judged as the occurrence of an error and the processing of discarding the transmitted packet or the like is performed. If there is the coincidence of addresses in the entry in the NAT table ("Yes" in the Step S408), the FIN attribute (upward) value of the entry is changed from 0 to 1 (Step S409).

Next, a value of the FIN attribute (downward) in the corresponding entry is checked (Step S410) and, if the value is "1" ("Yes" in the Step S410), the entry is deleted (Step S411). At this time point, the converting address of the corresponding entry is temporarily stored in a storing area (not shown). After the deletion of the entry (Step S411) or when the value of the FIN attribute (downward) in the entry is 0 ("No" in the Step S410), the destination address of the packet is rewritten into the converting address (or the address being held by the storing area in which the address is temporarily stored) in the entry (Step S407). Then, the packet is transmitted to the local network 201.

Figure 5:
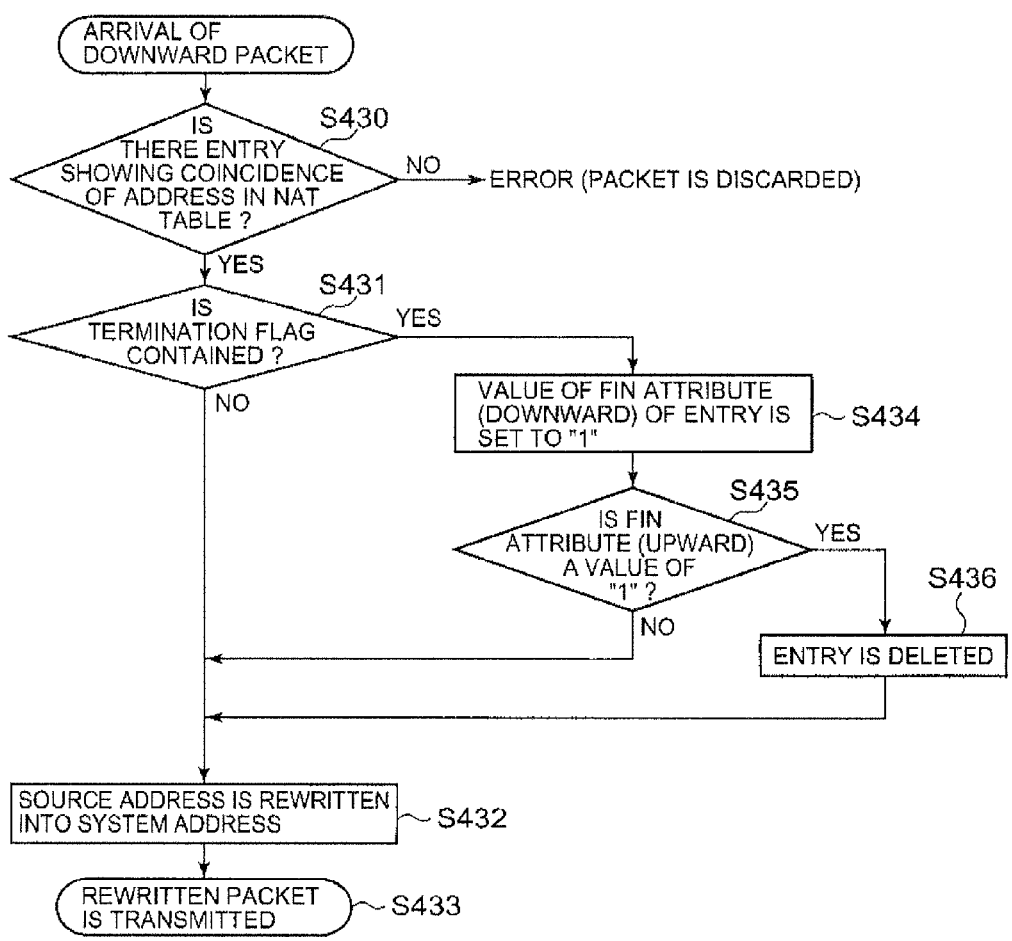
FIG. 5 is a flow chart showing operations of address conversion performed when a packet is sent from a server or dispatcher through the switching device to a client according to the present invention.

FIG. 5 is a flow chart showing operations of address conversion performed when a packet is sent out from a server or the dispatcher 240 through the switching device 210 to a client.

The switching device 210, when receiving a packet from the network 230, first checks whether or not there is any one of client addresses and client port numbers in each entry in the NAT table 225 which coincides with an destination address and destination port number of the received packet (Step S430). In another way, checking could be made from the viewpoint of whether or not there is any one of converting addresses in each entry in the NAT table 225 that coincides with a source address of the received packet.

If there is no coincidence of addresses in any entry in the NAT table 225 ("No" in the Step S430), the case is judged as the occurrence of an error and the processing of discarding the packet is performed. If there is coincidence of addresses in an entry in the NAT table 225 ("Yes" in the Step S430), whether or not the packet contains a termination flag is checked. When the termination flag is not contained ("No" in the Step S431), the source address of the packet is rewritten into a system address (Step S432) and the packet is transmitted to the network 260 (Step S433).

If the termination flag is contained in the packet ("Yes" in the Step S431), the FIN attribute (downward) value in the entry is changed from 0 to 1 (Step S434). Next, a value of the FIN attribute in the entry is checked and, if it is 1 ("Yes" in the Step S435), the entry is deleted (Step S436). After the deletion of the entry or when the value of the FIN attribute (upward) in the entry is 0 ("No" in the Step S435), the source address of the packet is rewritten into a system address (Step S432) and the packet is transmitted to the network 260 (Step S433).

Next, functions and operations of the dispatcher are described.

The dispatcher 240 includes at least a communicating section 241, a session information storing section 245, a session setup section 244, an analyzing section 242, and a session transferring section 243 and is configured to operate according to program control. The dispatcher 240 sets up a session with a client. Its analyzing section 242 transfers the setup session to a server to achieve the session transfer to the server.

The communicating section 241 is a given communicating means connected to the local network and performs the same operations as the client-side communicating section 211 and server-side communicating section 212 in the switching device 210. If the switching device 210 and servers 250-1 to 259-$n$ use the same communicating protocol, communication among them is established. Therefore, it is not always necessary that physical media of all of the communicating sections are the same. A unique fixed address is assigned to the communicating section 241 in the local network.

The session information storing section 245 is a storing section to hold information (session information) about the session setup between a client and dispatcher 240. When a session is set up, information is created for every session which is deleted when the session is terminated or is transferred.

The session setup section 244 sets up a session with a client.

An additional address is allowed to be set to the communicating section 241. A packet destined for an address, out of unused addresses selected by the switching device, held by the communicating section 241 is to be received by the dispatcher 240. Therefore, if a packet has a request for new session, the packet transmitted in the Step S404 in FIG. 4 is received by the dispatcher 240 and the session setup section 244 sets up a session with client. Unlike in the conventional switching of a server, in the first embodiment, session setup between the switching device 210 and client is not required.

Generally, an additional address being managed in the switching device 210 as an unused address is assigned to the dispatcher 240 in an initial state. However, an additional address being not used could be assigned periodically, as an unused address, to the communicating section 241 of the dispatcher 240.

The analyzing section 242 analyzes contents of a request received through a session set up with a client. Based on a result from the analysis, a proper server is selected. Moreover, as a method for the analysis and a method for selecting a proper server, any conventional given method can be employed. An example of the request is a request using an HTTP (HyperText Transfer Protocol).

The session transferring section 243 transfers a session selected by the analyzing section 242 to a server. Hereinafter, descriptions are made assuming that the server 250-1 is selected. The session information is obtained from the session information storing section 245 and is transferred through the communicating section 241 in the dispatcher 240 and the communicating section 251-1 in the server 250-1 to a session transferring section 253-1 in the server 250-1.

In the packet communication, data communication is carried out in a unit of a packet and start and termination of a session is informed explicitly. Therefore, unless the termination of a session is explicitly informed to a party to be communicated with, the session is still continued even if packets are not sent.

When a given packet has not been accepted by a party to which a packet is to be transmitted, the session is made to be invalid by returning a special packet meaning denial. If the packet is accepted, the session can be continued. As a method of judging whether or not a packet is to be accepted, for example, a method in which checking is made as to whether or not session information is stored in the session information storing section can be used. Therefore, if session information exists in the session information storing section, the session can be continued.

Therefore, even if a server to receive a packet of a given session is changed, so long as the session information is taken over correctly by the session information storing section, the continuation of the session is made possible because the session information meets a judging criterion for receiving a packet. Such a transfer process of a session is disclosed in, for example, a Technical Reference 3 (V. Pai et al., "Locally Aware Request Distribution in Cluster-based Network Servers", Architectural Support for Programming Languages and Operating Systems, 1998).

In the first embodiment, switching between the dispatcher 240 and servers 250-1 to 250-$n$ is made, with the session being still continued, by correctly taking over the session information from the dispatcher 240. Hereinafter, this process is expressed as "a session is transferred (from the dispatcher 240 to the servers 250-1 to 250-$n$)".

The session information contains a source address and a destination address in the packet communication. In the conventional examples, a fixed address set to a communicating section of a server is used as a destination address in the session information when setting up a session, which, however, makes it difficult to transfer a session. This is because, in order to transfer a session, a fixed address of a server has to be transferred.

According to the first embodiment, an address contained in the session information to be transferred is not a fixed address but an additional address, thereby enabling free transfer of a session.

When a session setup between the dispatcher 240 and a client is transferred to a server, the session transferring section 243 in the dispatcher 240 receives session information from the session information storing section 245 and sends out the information to the session transferring section 253-1 in the servers 250-1.

The session transferring section 253-1 in the server 250-1 sets the received session information to the session information storing section 255-1. Moreover, the session transferring section 253-1 sets an additional address contained in the session information to the communicating section 251-1.

The session transferring section 243 in the dispatcher 240 deletes the additional address of the transferred session from the communicating section 241. As a result, after the transfer of the session, not the dispatcher 240 but the server 250-1 comes to send and receives a packet of the session. That is, since the communication with a client is taken over by the server 250-1 of a party to which the session has been transferred without getting terminated.

Figure 6:
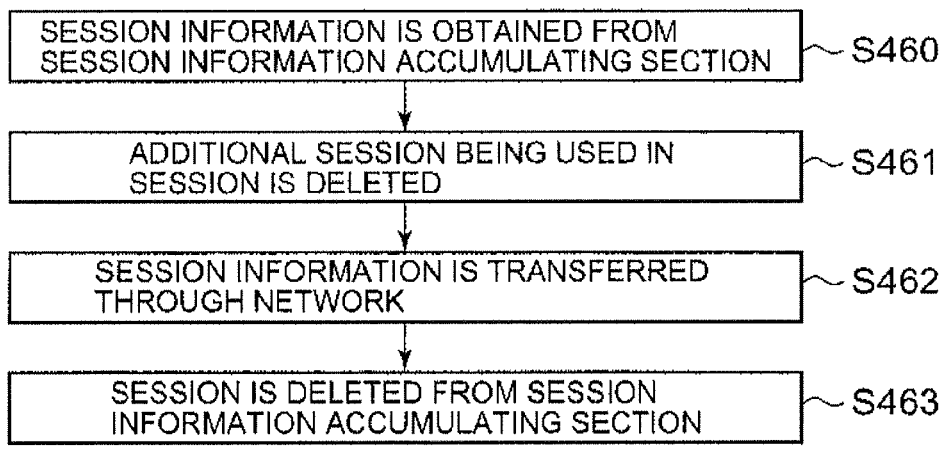
FIG. 6 is a flow chart showing operations in which the dispatcher transfers a session to a server according to the present invention.

FIG. 6 is a flow chart showing operations in which the dispatcher 240 transfers a session to a server. With reference to FIG. 6, operations of the transfer of a session are explained in detail.

The session transferring section 243 obtains, in accordance with an instruction from the analyzing section 242, the session information stored in the session storing section 245 (Step S460). An additional address selected by the switching device 210 at the time of setup of the session is contained in the session information. The selected additional address is deleted from the communicating section 241 (Step S461). Due to this, the dispatcher 240 does not receive the packet destined to the address. Then, the session information is transferred through the communicating section 241 and the network 230 to the session transferring section 253-1 in the server 250-1 (Step S462) and the session information is deleted from the session information storing section 243 (Step S463).

The session information to be used at the time of transferring the above session contains at least a sequence number of a packet received from a client before the transfer of the session, a sequence number of a packet transmitted to a client, an additional address, and an address of a client. The session information additionally contains information required for maintaining a session by using a protocol being currently used.

Next, with reference to FIG. 1, configurations of the server is explained. Hereinafter, the server 250-1 is described but same for other servers.

The server 250-1 is made up of a communicating section 251-1, an application server 252-1, a session information accumulating section 255-1, and a session transferring section 253-1.

The communicating section 251-1 is a given communicating means connected to the network 230 and its operations is the same as the communicating section 241 of the dispatcher described above. If the switching device 210, the dispatcher 240, and each of the other servers use the same communicating protocol, communication among them is established. Therefore, it is not always necessary that physical media are the same. A different fixed address is assigned to each of the servers.

The application server 252-1 interprets a request from a client and sends out a proper response to the request. For example, if a request is for asking to get a content of a file, the server is provided with a storage device and the application server 252-1 reads an appropriate file from the storage device (not shown) and sends out the read content of a file.

The session information accumulating section 255-1 is a section to hold information about the setup session, as in the case of the session information storing section 245 in the dispatcher 240.

The session transferring section 253-1 receives session information when a session is transferred from the dispatcher 240 to the server 250-1 and sets the session information and additional address as described later.

Figure 7:
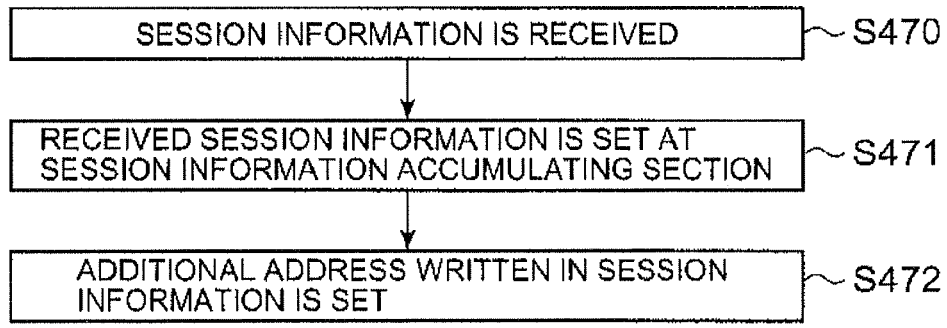
FIG. 7 is a flow chart showing operations of a server when receiving a session from the dispatcher according to the first embodiment of the present invention.

FIG. 7 is a flow chart showing operations of a server when receiving a session from the dispatcher 240. By referring to FIG. 7, operations performed at a time of receiving a session are explained.

The session transferring section 253-1 in the server 250-1 receives session information (Step S470) and sets the session information to the session information accumulating section 255-1 (Step S471). Moreover, the additional address written in the session information is set to the communicating section 251-1 (Step S472).

Figure 8:
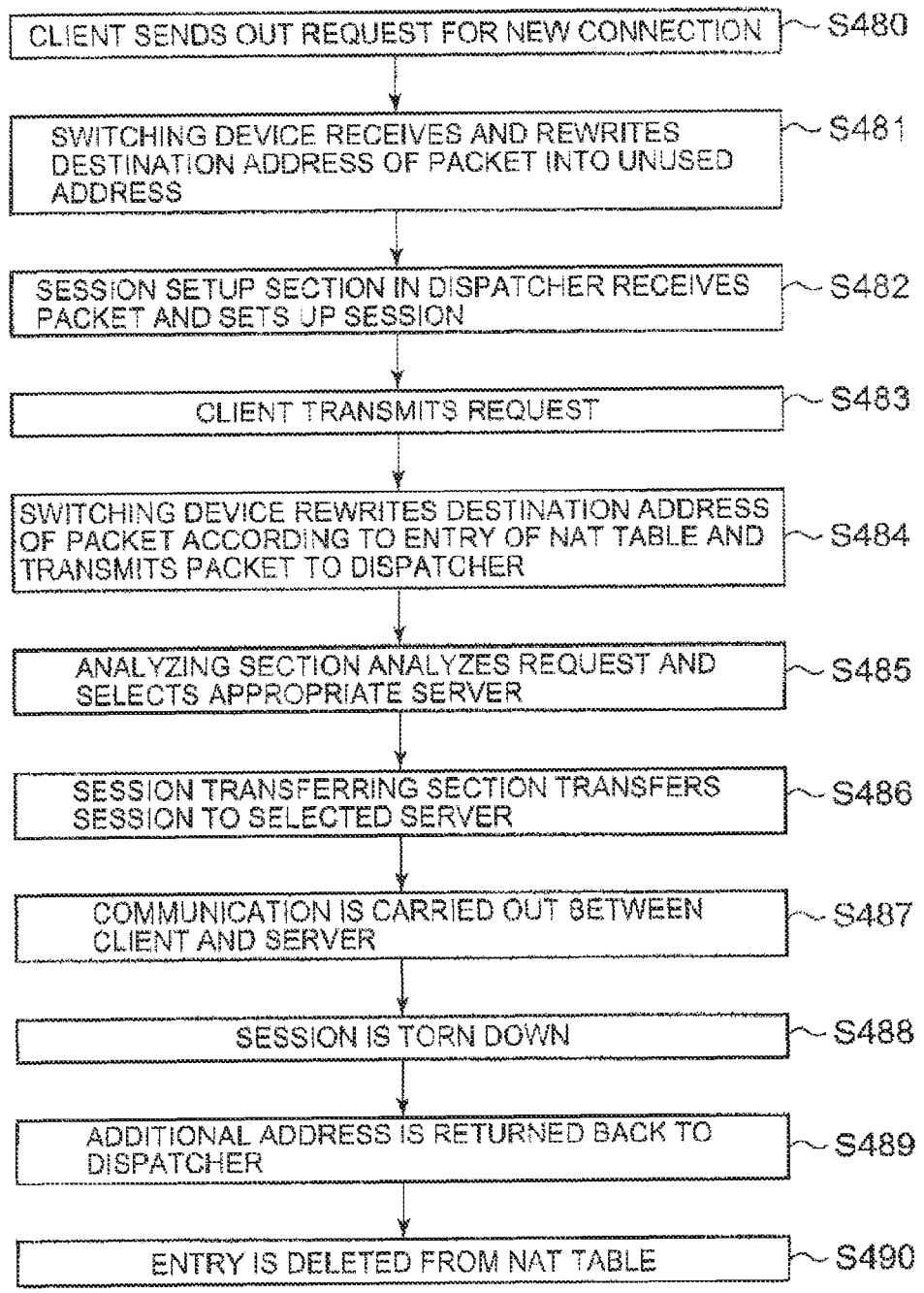
FIG. 8 is a flow chart showing flows from issuance of a request for new connection by a client to termination of a session.

Next, a flow from a time point when a client issues a request to a time point when a process between the client and server is completed and when the session is terminated is explained. FIG. 8 is a flow chart showing the above process.

As shown in FIG. 8, in order to set up a session, a client first sends out a packet containing a request for new session to a device having a system address (Step S480). The packet is received through the network 260 by the switching device 210. The switching device 210, as described above, selects one of unused addresses as a converting address, out of additional addresses, rewrites a destination address of the packet into the converting address, and transmits the converting address to the local network 201 (Step S481). At this time point, a new entry is created in the NAT table. Since the address has been in advance assigned and set to a communicating section in the dispatcher 240, the session setup section 244 in the dispatcher 240 receives the packet. Thus, a session is set up between the client and dispatcher 240 (Step S482).

Next, the client transmits a packet containing a request to a device having a system address (Step S483). The switching device 210 rewrites a destination address into a converting address according to a content of the entry in the NAT table and transmits the rewritten address (Step S484) and the analyzing section in the dispatcher 240 receives the request. The analyzing section 242 analyzes contents of the received request and selects an appropriate server (here, the server 250-1 is selected) (Step S485). Next, the analyzing section 242 instructs the session transferring section 243 to transfer the session information to the session transferring section 253-1 in the selected server (Step S486). That is, the additional address and session information are deleted from the dispatcher 240 and the transferred session information and additional address are set in the selected server 250-1.

Although a device to receive a packet from a client is changed from the dispatcher 240 to the server 250-1 due to the transfer of a session, rewriting of the entry in the NAT table is not required.

Moreover, even if the session is transferred, since a sequence number in the session information is taken over as it is, management of the sequence number by the switching device 210 and the rewriting process as performed in the conventional process are not required.

Thereafter, a packet is transmitted or received by the above session between the selected server 250-1 and a client (Step S487). A destination address of a packet having sent from a client to a server is rewritten into a converting address by the switching device 210 and reaches the server 250-1. The server 250-1 makes the application server 252-1 create a response corresponding to a content of a request and transmits the response to a client. A source address of the packet transmitted from the server 250-1 to the client is again rewritten by the switching device 210 into a system address by making a reference to the NAT table and the rewritten address reaches the client. Any method of transferring the content of a request can be used and, for example, the content of the request can be contained in the session information to be transferred.

The server 250-1, after having sent all required responses, transmits a packet containing a termination (FIN) flag to terminate a session. This causes the FIN attribute (downward) value to be 1 in the entry of the NAT table in the switching device 210. Next, a packet containing a termination flag is transmitted from a client. This causes the FIN attribute (upward) value to become 1 in the entry of the NAT table in the switching device 210 and the entry is deleted (Step S488). In some cases, transmission of the packet containing a termination flag to terminate the session is performed first by a client.

After the termination of a session, an additional address used in the session is returned back from the server 250-1 to the dispatcher 240. That is, the server 250-1 cancels the setting of the additional address used in the session and instructs the dispatcher 240 to again set an additional address to the communicating section 241. In reply to this instruction, the additional address is set to the communicating section 241 of the dispatcher 240.

Thus, even though a session is taken over, as it is, from the dispatcher 240 to a server when a server is switched, only the address portion of a packet is rewritten and, therefore, the calculation of a sequence number or its rewriting are not required. Also, when a session is transferred from the dispatcher 240 to a server, since the same additional address is used, rewriting in the NAT table is not required. Therefore, unlike in the conventional case, loads of rewriting and/or amounts of information to be managed can be reduced.

Figure 9:
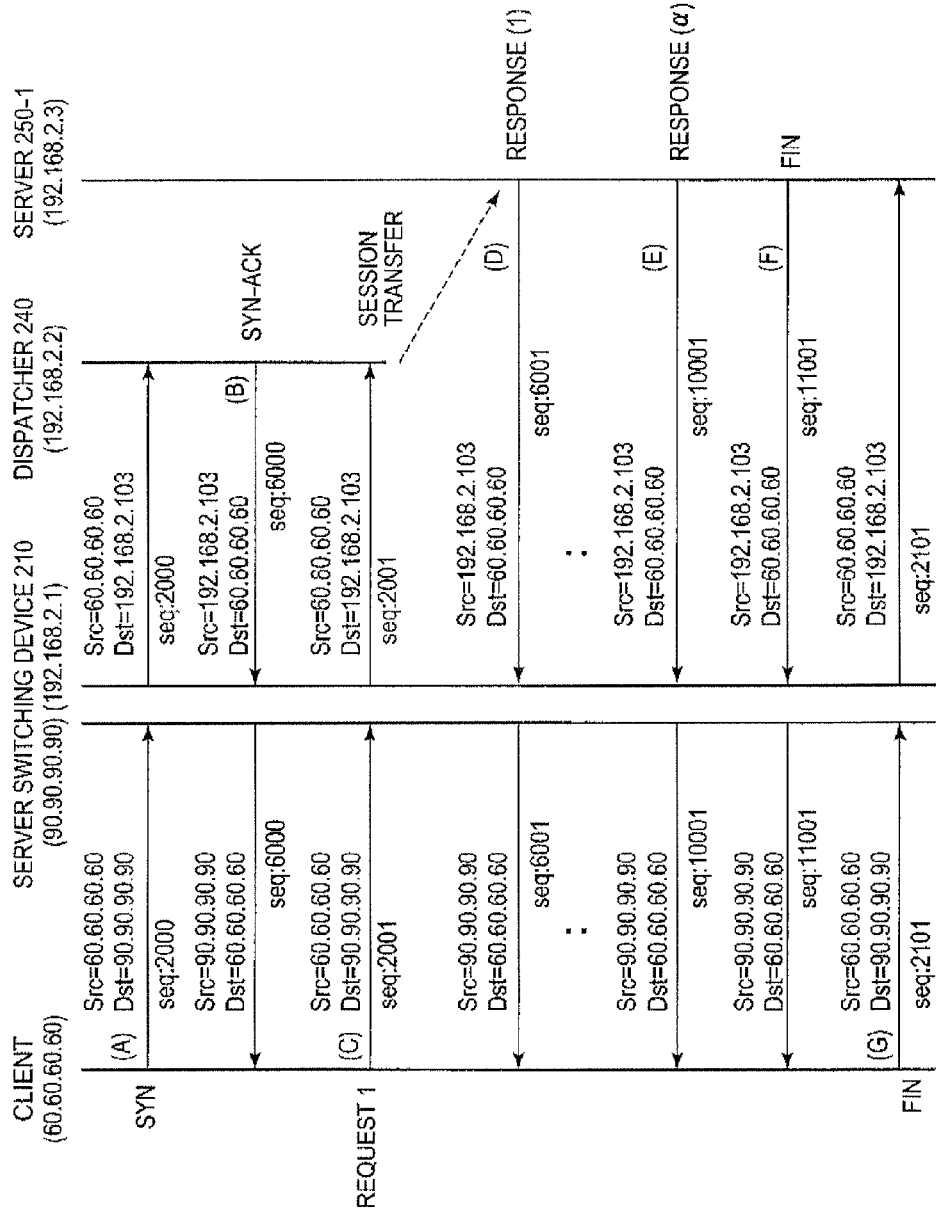
FIG. 9 is a sequence diagram showing flows of operations according to the first embodiment of the present invention.

Examples of operations of the first embodiment are described by referring to FIGS. 9 and 10, and FIG. 1 showing configurations of the switching system. In the first embodiment, as a communication protocol, TCP/IP (Transmission Control Protocol/Internet Protocol) is used.

FIG. 9 is a sequence diagram showing a flow of operations according to the first embodiment. In FIG. 9, all the descriptions of an ACK (Acknowledgement) packet are omitted. In the first embodiment, as shown in FIG. 9, the system address of the switching device 210 is 90.90.90.90 and fixed address is 192.168.2.1. The fixed address of the dispatcher 240 is 192.168.2.2. The address of a client is 60.60.60.60. In the first embodiment, a port number is not rewritten and, therefore, the representation of the packet shown in FIG. 9 as header information is omitted accordingly.

FIG. 10 shows a change of the state of the NAT table 225 of the switching device 210. At the stage before a request for new session is received from a client, it is now assumed that the NAT table 225 gets into the state shown in FIG. 10. First, a client issues a SYN (Synchronized) packet ([A] in FIG. 10). The source address (src) is 60.60.60.60 and the destination address (dst) is 90.90.90.90. An initial value of the sequence number is 2000. A SYN packet transmitted by a client is received by the switching device 210 and an unused additional address 192.168.2.103 is selected as a converting address. A destination address is rewritten into the converting address 192.168.2.103 and is sent out to the network 230. The switching device 210 creates a new entry in the NAT table 225 by associating a client address, port number of the client, and selected additional address (converting address). Therefore, the NAT table gets into the state shown in FIG. 10 (B). Since this additional address is held by the dispatcher 240 (and set at the communicating section 241), the dispatcher 240 receives the SYN packet whose destination address has been rewritten to set up a session. The dispatcher 240, after setting the sequence number to be 6000, transmits a SYN-ACK packet (FIG. 9 (B)) having the sequence number to a client. The switching device 210 confirms the information in the NAT table 225 and rewrites a source address into a system address and transmits the rewritten packet to the network 260. More specifically, the switching device 210 finds out an entry having the source address 60.60.60.60 in the NAT table 225, rewrites the source address into 90.90.90.90 and transmits the packet to a client.

Next, the client transmits a packet (FIG. 9 (C)) containing a request. The sequence number at this time is 2001 and a length of a request is 100 bytes. The switching device 210 takes out an entry in which a source address and destination port number of the request packet coincide with a client address and client port number in the NAT table 225, rewrites a destination address of a packet into a corresponding converting address (192.168.2.103) and transfers the packet to the dispatcher 240. The analyzing section 242 of the dispatcher 240 analyzes a request and selects a proper server (address is 192.168.2.3). The session transferring section 243 transfers the session to the selected server 250-1.

In some cases, the switching device 210 sends out an ARP (Address Resolution Protocol) request when transmitting a packet to a device having the converting address (192.168.2.103), after the transfer of a session. Since the additional address is already set at the server 250-1 at this time, the server 250-1 returns a MAC (Media Access Control) address as a response. Then, the switching device 210 transmits a packet to the returned address MAC address.

In the case of a device which caches an response to the ARP request for achieving efficient communication, the caching can be made invalid or be updated by receiving an instruction from an outer device. In the latter case, communication can be continued without issuing the ARP request after the transfer of a session and, therefore, communication is made efficient.

The application server 252-1 operating on the server 250-1 creates a response to a request and sends to a client (FIG. 9(D)). It is now assumed that a length of the first response is 1000 bytes. The source address of this packet, as in the case of a packet (FIG. 9(B)), is rewritten into a system address and is transmitted to a client. After the α times transmission for all responses is completed (FIG. 9(E)), the server transmits a FIN packet (Fig. (F)) representing termination. The switching device 210 having received this packet detects a FIN flag and makes a FIN attribute (downward) value of an entry become [1] in which a destination address and destination port number of a packet coincide with a client address and client port number. Therefore, the NAT table gets into the state shown in FIG. 10 (C). The source address of the packet, as in the case of FIG. 9 (B), is written into 90.90.90.90 and is transmitted to a client.

Thereafter, a FIN packet (FIG. 9(G)) is transmitted from a client. The switching device 210 having received this packet detects a FIN flag and makes a FIN attribute (upward) value of an entry become "1" in which a source address and source port number of the packet coincide with a client address and client port number. Therefore, the NAT table gets into the state shown in FIG. 10(D). After the destination address of a packet is rewritten into 192.168.2.103 and is transmitted to the network, the entry is deleted. The NAT table after being deleted gets into the state shown in FIG. 10(A).

In the above description, though a session in which a server is switched by a combination of an address of a client and a port number is specified, it is also possible to make switching only based on an address of a client. Almost the same switching can be made by not only an address or port number but also an identifier to identify a source address of a session.

Modified Example of First Embodiment

The dispatcher and server conventionally employ an additional address selected for every session as a source address of a packet to be transmitted to a client. The switching device 210 rewrites the source address of the packet into a system address.

It is envisioned that, at the time when each of the dispatcher and server transmits a packet, a source address of a packet is rewritten into a system address. In this modified example, rewriting of a source address of a packet using the switching device 210 is not required and the Step S432 in FIG. 5 can be omitted.

In the explanation of the Step S430 in FIG. 5 according to the first embodiment, a method for checking the coincidence between a converting address of each entry and a source address of a packet is not applicable to check whether or not an entry exists in the NAT table. This is because, in the modified example, source addresses of packets are all system addresses and such an entry as described above does not exist.

Second Embodiment

The First embodiment assumes a protocol in which a flag explicitly representing the start and termination of a session exists, such as TCP. In the second embodiment, a case is explained in which a protocol does not have an explicit start and termination of a session. As an example of such a protocol is UDP (User Datagram Protocol).

Configurations of the switching system of the second embodiment are the same as shown in the first embodiment in FIG. 1. In the second embodiment, configurations of an entry of the NAT table 225 are different from those in the first embodiment. This causes a flow of address converting processes to be changed in the switching device. Hereinafter, the difference is explained.

FIG. 11 is an example of an entry of the NAT table 225 in the second embodiment. As shown in FIG. 11, the entry is made up of an address of a client, a client port number, and a converting address only. Moreover, as shown in the first embodiment, a combination of an address and port number is not necessarily needed and even only the address is sufficient, that is, an identifier to identify a source address of a session may be simply used. Hereinafter, an example using a combination of an address of a client and port number is explained.

FIG. 12 is a flowchart representing a flow of processing a packet received from a client in the address converting section 220. As shown in FIG. 12, when a packet is received, an entry in the NAT table in which a source address and source port number of the received packet coincide with a client address and client port number is found out (Step S600). If there is coincidence of addresses ("Yes" in Step S600) in an entry in the NAT table, a destination address of the packet is rewritten into a converting address (Step S601) and the address is transmitted (Step S602).

If there is no coincidence of addresses in any entry in the NAT table (No in Step S600), one unused address is selected (Step S603). Any conventional given algorithm can be used as a selection algorithm. Next, a new entry is created in the NAT table 225 (Step S604). With this entry, the unused address is rewritten into a converting address and a source address into a client address and a source port into a client port. Then, a destination address of a packet is rewritten into the converting address and the rewritten address is transmitted from the server-side communicating section 212 (Step S605).

Figure 13:
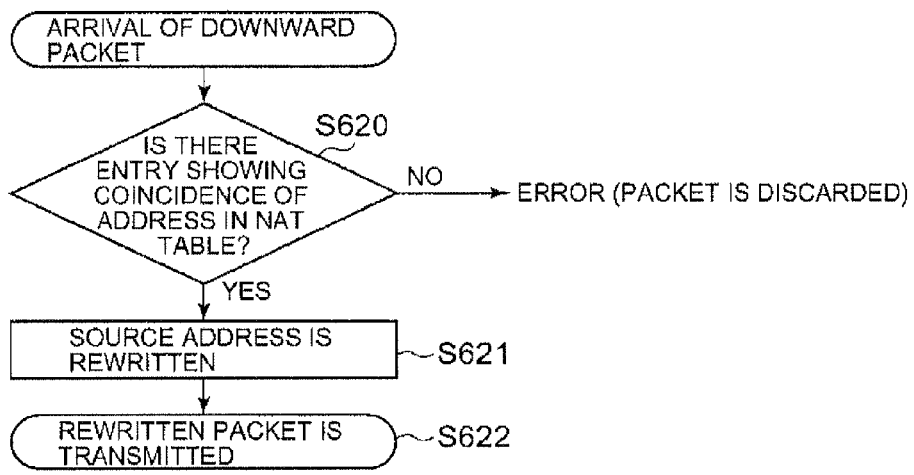
FIG. 13 is a flow chart showing operations of rewriting of a packet transmitted from the dispatcher or server to a client in the switching device according to the second embodiment of the present invention.

Next, rewriting of a packet transmitted to a client from the dispatcher or server in the switching device 210 is explained. FIG. 13 is a flow chart showing operations of rewriting of a packet transmitted from the dispatcher 240 or server to a client in the switching device 210.

As shown in FIG. 13, the address converting section 220 having received a packet from the network 230 first retrieves a client address from the NAT table 225 and checks whether or not there is any one of client addresses in each entry that coincides with a destination address of a packet (Step S620). At this time point, whether or not there is any one of converting addresses in each entry which coincides with a source address of the packet may be also checked.

If there is coincidence of addresses in an entry ("Yes" in Step S620), a source address is rewritten into a system address (Step S621) and a packet is transmitted from a client-side communicating 211 (S622).

If there is no coincidence of addresses in any entry in the NAT address (Step S620), the case is judged as the occurrence of an error and processing of discarding the packet is performed.

In the second embodiment, since a session is not terminated explicitly and, in another words, the termination of a session is not managed explicitly, there is no explicit chance of deleting an entry in the NAT table. A monitoring section (not shown) deletes entries for which no communication was not carried out for a predetermined period of time.

The server deletes an additional address of a session for which no communication is carried out for a predetermined period of time and advises the dispatcher 240 of the deletion. Then the dispatcher 240 sets the additional address to the communicating section 241.

Figure 14:
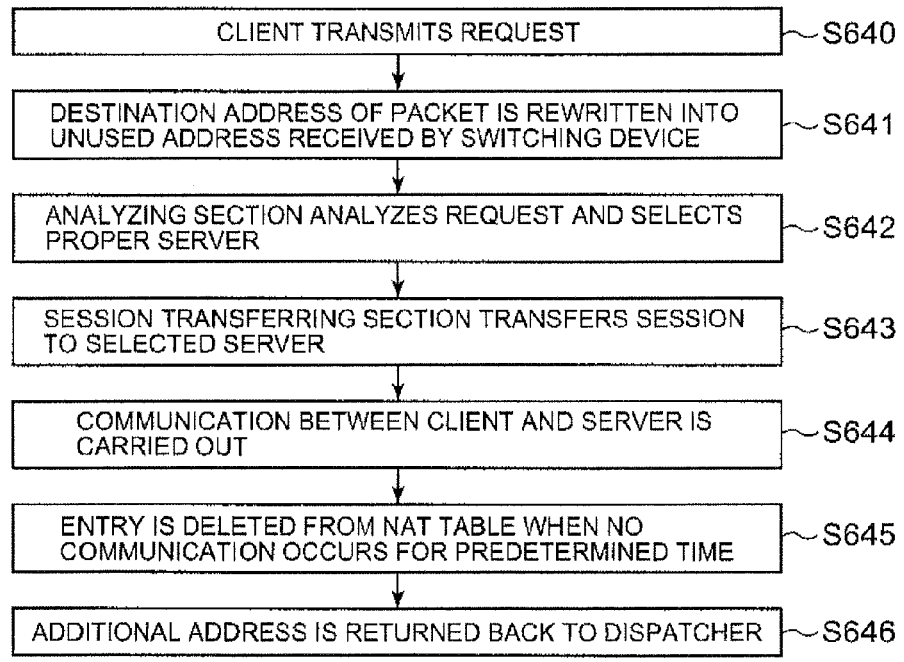
FIG. 14 is a flow chart showing operations of a server switching operation according to the second embodiment of the present invention.

Next, processing of server's switching of the second embodiment is described. FIG. 14 is a flow chart showing operations of server switching.

As shown in FIG. 14, a client transmits a packet containing a request to a system (Step S640). The packet is received by the switching device 210 through the network 260 and client-side communicating section 211. The switching device 210 selects one additional address as a converting address out of unused addresses and rewrites a destination address of a packet into a converting address and transmits the packet to the network 230 (Step S641). At this time, a new entry is created in the NAT table. Since the selected additional address is assigned to the communicating section 241 of the dispatcher 240, the session setup section 244 in the dispatcher 240 receives the packet. The session setup section 244 creates session information required for setting up a session with a client and stores in the session information accumulating section 245.

Next, the analyzing section 242 in the dispatcher 240 analyzes a received request and selects a proper service (Step S642). The analyzing section instructs the session transferring section 243 of the selected server (being supposed that the server 250-1 is selected) to transfer session information (Step S643). The selected additional address and session information are deleted from the communicating section 241 of the dispatcher 240 and the selected server 250-1 performs setting of transferred session information and of selected additional address to the communicating section 251-1.

Thus, though a device used to process a request by transferring a session is changed from the dispatcher 240 to the server 250-1, no rewriting of an entry in the NAT table is required.

The application server 252-1 of the selected server 250-1 creates a response depending on a content of the request and sends it out to a client (Step S644). A source address of the packet transmitted from the server 250-1 to the client is referenced by the NAT table 225 and is rewritten into a system address. Then the rewritten address is transmitted to the client.

After the completion of transmission of all required responses, communication in the session does not come to occur and, after the lapse of a predetermined time, the entry in the NAT table 225 is deleted (Step S645). At this time point, an additional address (converting address) used in the session is deleted from the server 250-1 and is returned back to the dispatcher (Step S646). The dispatcher 240 again sets the additional address to the communicating section 241.

In the protocol envisioned in the second embodiment, a sequence number is not used. In such a case, a sequence number is not contained in session information used when a session is transferred. The session information to be transferred contains an additional address and information required in a protocol.

As described above, in the second embodiment, no change of an entry of the NAT table is required even when a server is switched.

Modified Example of the Second Embodiment

In the modified example of the second embodiment, a source address of the packet is rewritten into a system address when a dispatcher and each server transmit a packet, as in the case of the first embodiment.

Therefore, rewriting of a source address of a packet by the switching device is not required and, as a result, the Step S621 in FIG. 13 is omitted.

However, in this case, when checking is made as to whether there is an entry in the NAT table (Step S620 in FIG. 13), the method of checking the coincidence between an internal side address of each entry and a source address of a packet cannot be used. This is because, since all source addresses of a packet are rewritten into system addresses in this modified example, such an entry does not exist in the NAT table.

By further optimization, if no error processing is required when an entry does not exist in the NAT table, it is possible for the switching device to omit all processes in FIG. 13 and to send out the received packet, as it is.

Third Embodiment

In the first embodiment, a state is envisioned in which, in one session, one request is made by a client and a response to the request is made by a server. It is possible that, depending on a request, in one session, a plurality of requests is sequentially made by a client and each response to the plurality of requests is sequentially received. In the third embodiment, a state is described in which, in one session, a plurality of requests is made by a client and each response to the plurality of requests is made by a server.

Configurations of the switching system of the third embodiment are the same as those of the first embodiment shown in FIG. 1. Address rewriting operations in the switching device 210 are the same in the first embodiment. In the third embodiment, when the second request and thereafter is processed, a session is transferred from the server to the dispatcher.

Processes employed when a server transfers a session are the same as those in FIG. 6. On the other hand, processes employed when a dispatcher receives a transferred session are the same as those in FIG. 7. That is, although roles of the dispatcher and the server are exchanged between in the first embodiment and the third embodiment, processes themselves remain unchanged.

Figure 15:
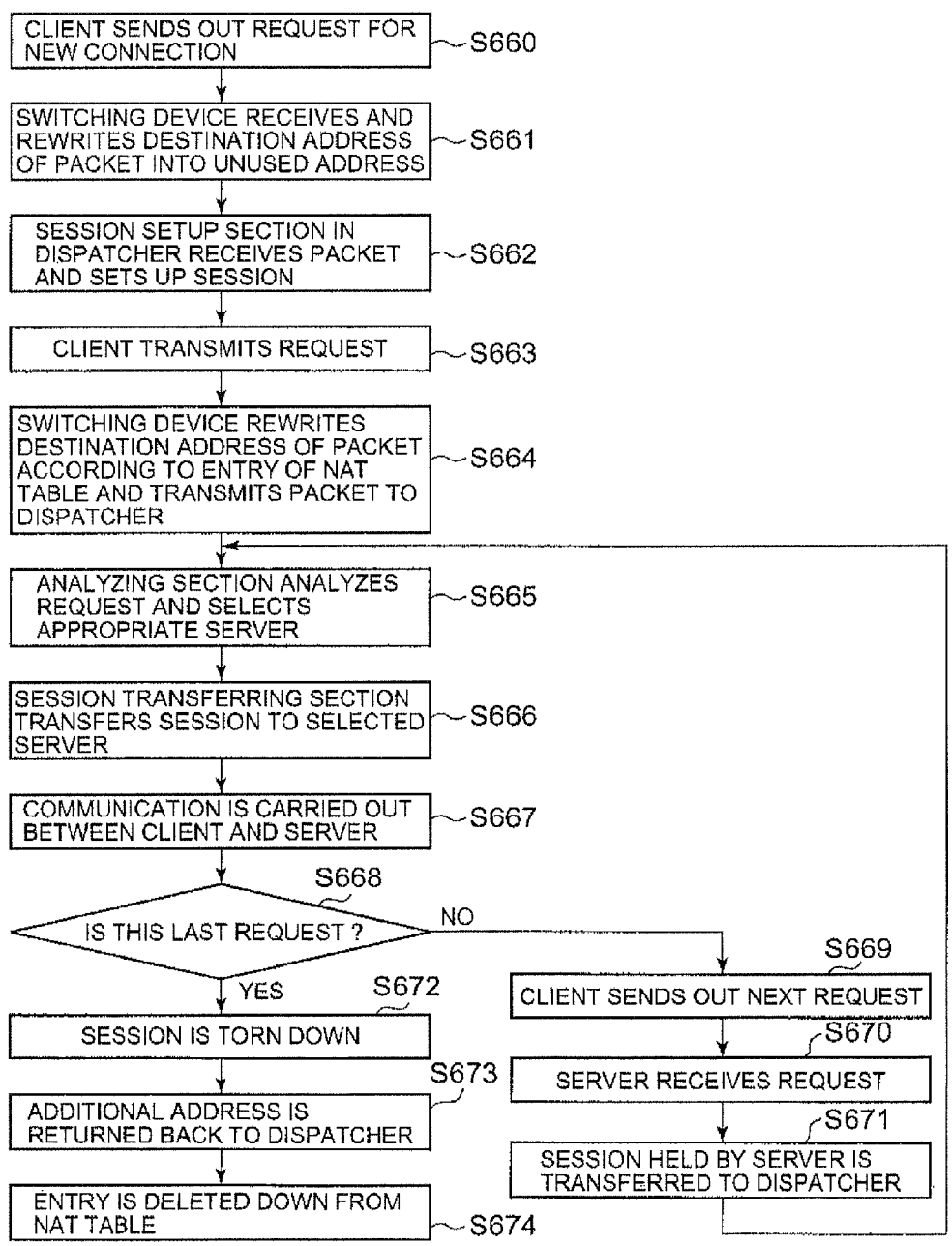
FIG. 15 is a flow chart showing flows of operations in which a client transmits a plurality of requests and receives responses according to a third embodiment.

FIG. 15 shows a flow in which a client transmits a plurality of requests and receives a response. The processes 5660 to S667 in FIG. 15 are the same as the processes S480 to S487 in FIG. 8 and, therefore, processes in Step S668 and thereafter in FIG. 15 are described below.

The server, after its completion of the response to a request (Step S667), checks whether or not a succeeding request exists (Step S668) and, if existing (Step S668), a client sends out a next request (Step S669). In the switching device 210, according to an entry in the NAT table, a destination address of the packet containing the next request is rewritten and is transmitted. At this time point, the server (assuming it is the server 250-1) still continues to hold an additional address and, therefore, the server 250-1 receives the packet (Step S670).

However, at this time, the application server 252-1 running on the server 250-1 does not read the next request and transfers the session to the dispatcher 240 (Step S671). The session information obtained at this time, as in the case of the first embodiment, contains a sequence number, additional address, information required for a protocol, while, in the third embodiment, further a packet of a request not read by the application server. Therefore, the session, with the request being not yet read, is transferred to the dispatcher 240. The analyzing section 242 in the dispatcher 240 reads the request, analyzes and again selects an appropriate server (Step S665). After that, a session is transferred from the dispatcher 240 to the selected server (Step S666) and a response is returned back to a client from the server (Step S667).

In the Step S668, if there exists no next request ("Yes" in Step S688), the session is terminated (Step S672) and the additional address is returned back to the dispatcher 240 (Step S673). The entry related to the session is deleted from the NAT table (Step S674).

Thus, in the case of responses to a plurality of requests, even though switching occurs from a dispatcher to a server or from a server to a dispatcher, no change of the NAT table in the switching device 210 is required. Moreover, calculation of a sequence number and rewriting in the switching device 210 are not necessary.

Additionally, in the third embodiment, as in the case of the first and second embodiments, a source address of a packet can be rewritten into a system address when the dispatcher and each server transmit a packet.

Fourth Embodiment

In the third embodiment, in the case of processing a plurality of requests, a session is transferred to the dispatcher every time a request arrives. However, in the fourth embodiment, each server reads a succeeding request and transfers the session to an appropriate server. If its own server is most appropriate, it is possible that the session is not transferred to another server and a response to a next request can be transmitted with holding the session.

Figure 16:
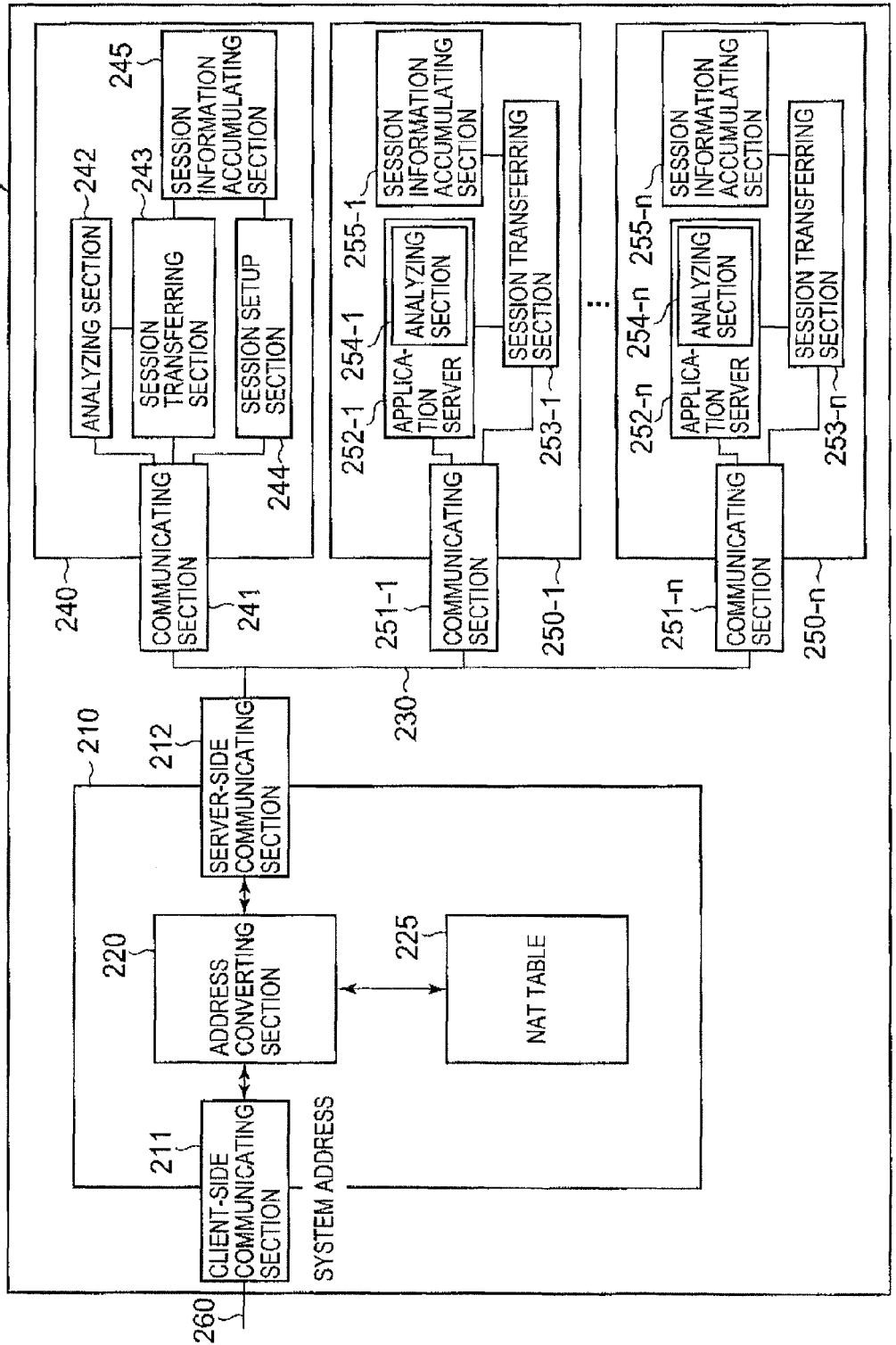
FIG. 16 is a block diagram showing configurations of a server switching system according to the fourth embodiment of the present invention.

FIG. 16 is a block diagram showing configurations of a switching device of the fourth embodiment. As shown in FIGS. 1 and 16, the switching device of the fourth embodiment differs from that of the first embodiment in that analyzing sections (254-1 to 254-n) are provided in the application servers. In the fourth embodiment, when a request is processed, the application server on the server reads a request and transfers the session from one server to another server or to a dispatcher.

The address rewriting process in the switching device of the fourth embodiment is the same as in the first embodiment (see FIGS. 4 and 5). The procedure applied when a server transfers a session is the same as shown in FIG. 6 and the procedure applied when other server receives the transferred session is the same as shown in FIG. 7. That is, in the case of session transfer performed when the second or subsequent request is processed, the procedure is the same as in the first embodiment and the server operates as both a sender and a receiver of the transferred session.

Figure 17:
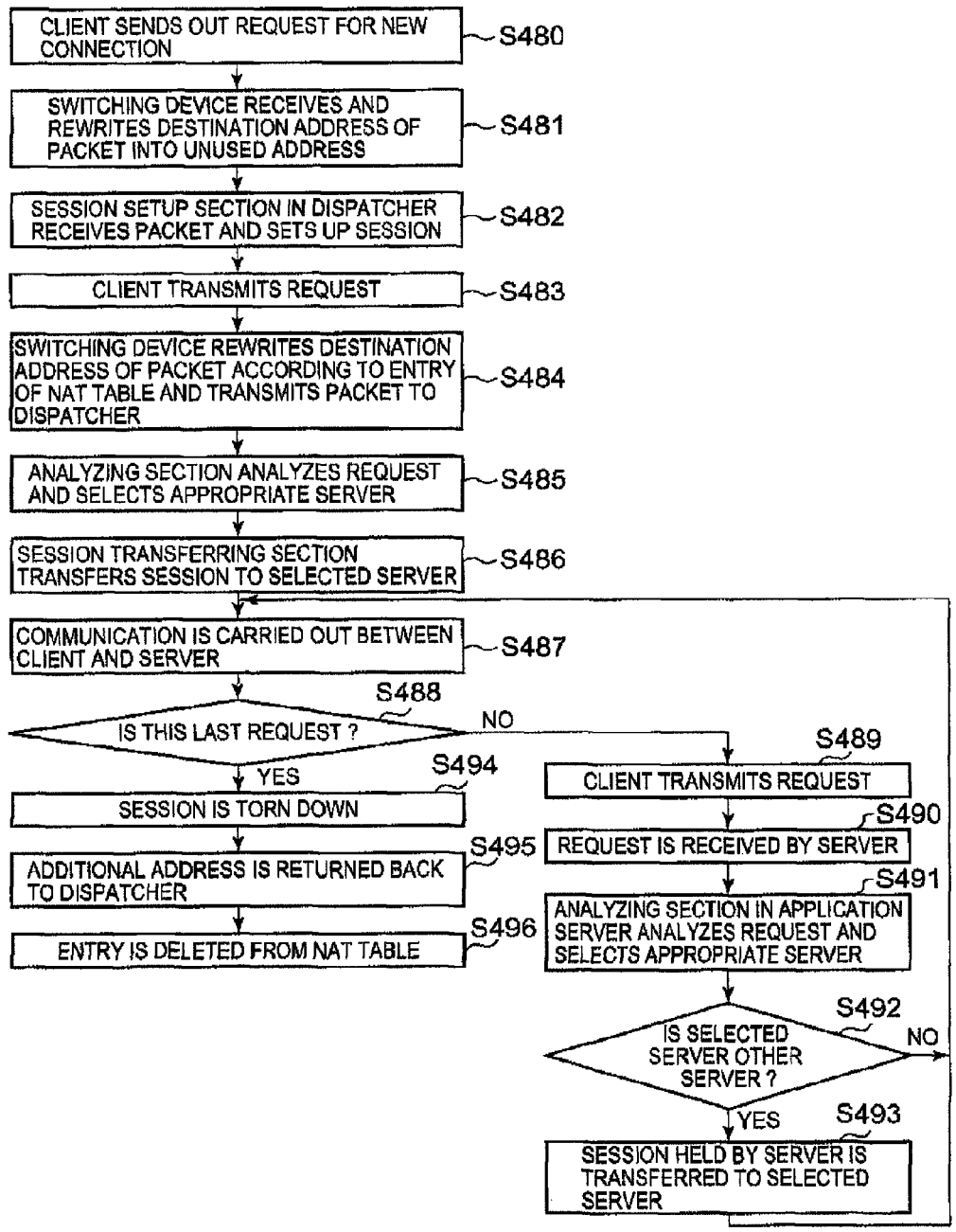
FIG. 17 is a flow chart showing flows of operations from client's transmission of a plurality of requests to server's response to the requests according to the fourth embodiment of the present invention.
Figure 18:
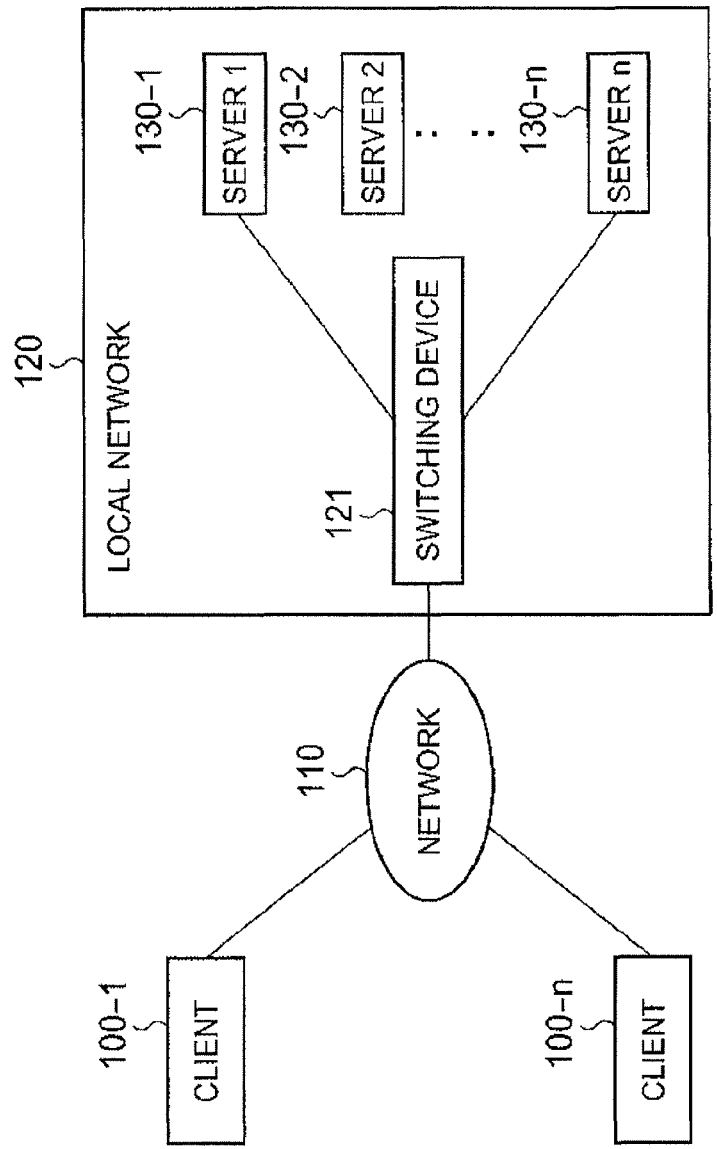
FIG. 18 is a block diagram showing connection configurations of a communication system with the conventional switching device.

FIG. 17 is a flow chart showing a flow of operations from client's transmission of a plurality of requests to server's response to the requests. By referring to the flow chart, processing performed when a client transmits a plurality of requests is explained. The processes S480 to S487 in FIG. 17 are the same as the processes S480 to S487 in FIG. 8 and, therefore, processes in Step S488 and thereafter in FIG. 17 are described below.

After finishing a response to a request (Step S487), when a succeeding request exists (No in the Step S488), a client transmits the succeeding request (Step S489). In the switching device 210, according to an entry in the NAT table 225, a destination address of the packet containing the next request is rewritten and is transmitted. At this time point, the server (assuming it is the server 250-1) still continues to hold an additional address and, therefore, the server 250-1 receives the packet (Step S490). Next, the application server 252-1 running on the server 250-1 reads a request and the analyzing section 254-1 selects an appropriate server (Step S491). If the selected server is its own server 250-1 ("No" in the Step S492), the application server 250-1 creates a response and transmits the response (Step S487). Otherwise, the selected server, for example, the server 250-n ("Yes" in the Step S492) receives the session from the server 250-1 (Step S493) and the application server 252-n in the selected server 250-n creates a response and transmits the response (Step S487).

At this time point, a request having already been read once may be contained in session information and transferred. Therefore, the session information contains a packet of the read request in addition to a sequence number, an additional address, and information required for a protocol. The application server in the selected server reads the request and creates the response.

In the Step S488, when a succeeding request exists ("Yes" in the Step S488), the session is terminated (Step S494) and an additional address is returned back to the dispatcher 240 (Step S495). The entry related to the session is deleted from the NAT table 225 (Step S496).

Thus, in the case of responses to a plurality of requests, even when switching occurs from the dispatcher to the server or from the server to other server, no change of the NAT table in the switching device is required. The processing of calculation of differences of sequence numbers and rewriting by the switching device are not needed.

Moreover, in the fourth embodiment, a source address of a packet can be rewritten into a system address when the dispatcher and each server transmit a packet, as in the case of first, second, third embodiments.

Fifth Embodiment

In the first embodiment, when a packet for new session request arrives, the address converting section 220 of the switching device 210 selects an additional address and creates an entry in the NAT table 225. In the fifth embodiment, the switching device 710 does not judge whether or not a packet is a request for new session. The switching device 710, when a packet whose corresponding information is not stored in the NAT table arrives, transfers the packet to a server having a default address. Then, the server or dispatcher having a default address sets up a session with a client. After the setup of the session, the server or dispatcher having set up the session transmits an instruction for creating an entry to the NAT table 225 of the switching device 710.

As the default address, a fixed address of the server or dispatcher managing an additional address can be used. In the fifth embodiment, a fixed address of the dispatcher is used as the default address. When a fixed address of the server is used as a default address, it is assumed that the server also has a session setup section.

Processing up to creation of an entry of the NAT table 225, processing by the switching device, and processing by the dispatcher in the fifth embodiment differ from those in the first embodiment.

Figure 21:
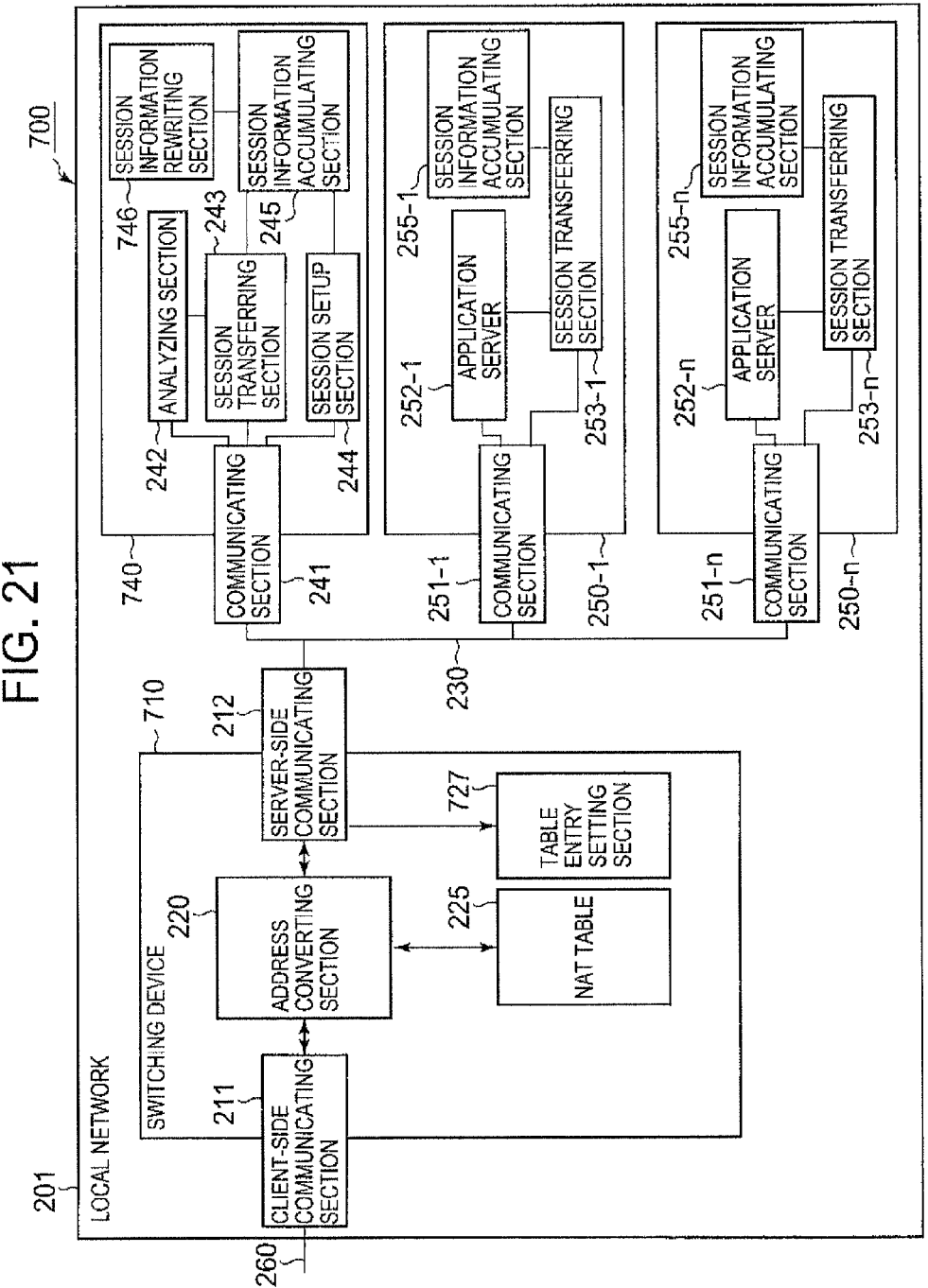
FIG. 21 is a block diagram showing configurations of a server switching system according to a fifth embodiment of the present invention.

FIG. 21 is a block diagram showing configurations of the switching device 700 of the fifth embodiment of the present invention. The switching device 700 of the fifth embodiment differs from those of the first embodiment in that a session information rewriting section 746 is added to the dispatcher 740 and a table entry setting section 727 is added to the switching device 710.

The session information rewriting section 746 of the dispatcher 740 manages an unused address (additional address not being used for communication) and, when the session setup section 244 sets up a session with a client, selects one of unused addresses. Then, the session information rewriting section 746 rewrites an address of a setup session stored in the session information accumulating section 245 into the selected unused address and provides to the table entry setting section 727 in the switching device 710 an instruction for creating an entry of the NAT table 225 holding correspondence information between the unused address and a client address.

The table entry setting section 727 receives the instruction from the session information rewriting section 746 and creates an entry in the NAT table 225 holding correspondence information between the additional address and client address. Configurations of the entry in the NAT table 225 in the fifth embodiment is the same as shown in FIG. 3. Moreover, the address converting section 220 stores a default address.

Figure 22:
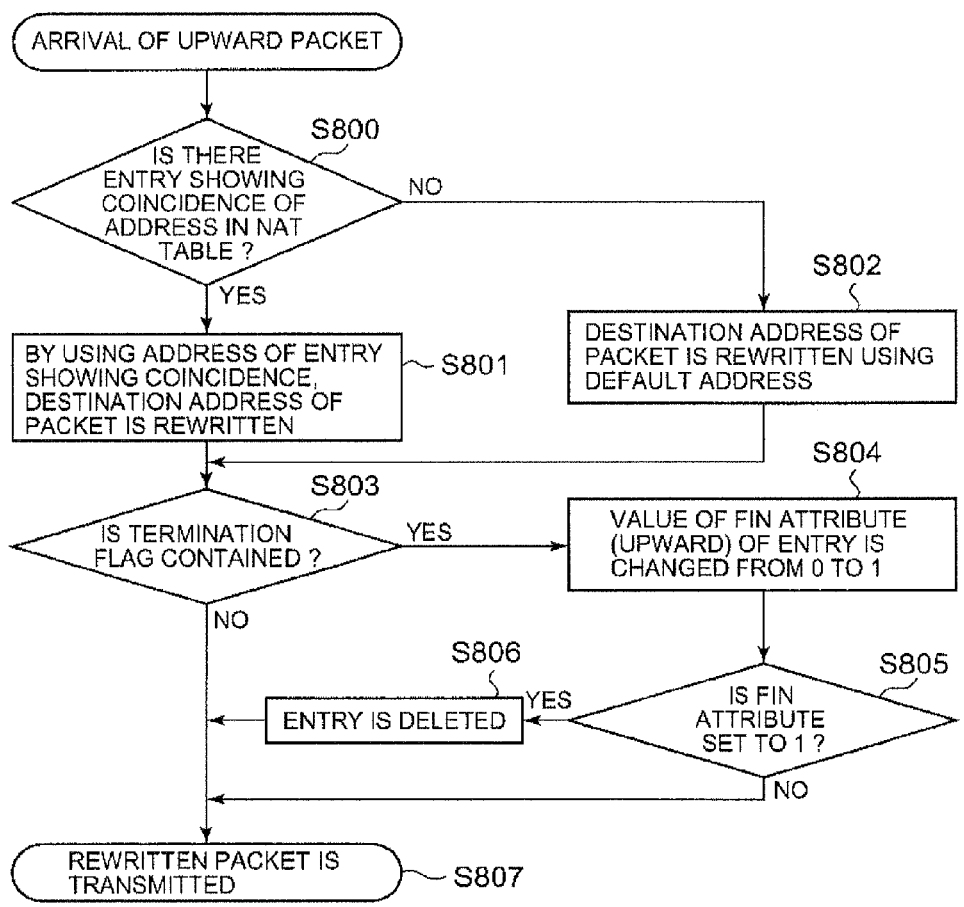
FIG. 22 is a flow chart showing address converting operations of a packet received from a client according to the fifth embodiment of the present invention.
Figure 23:
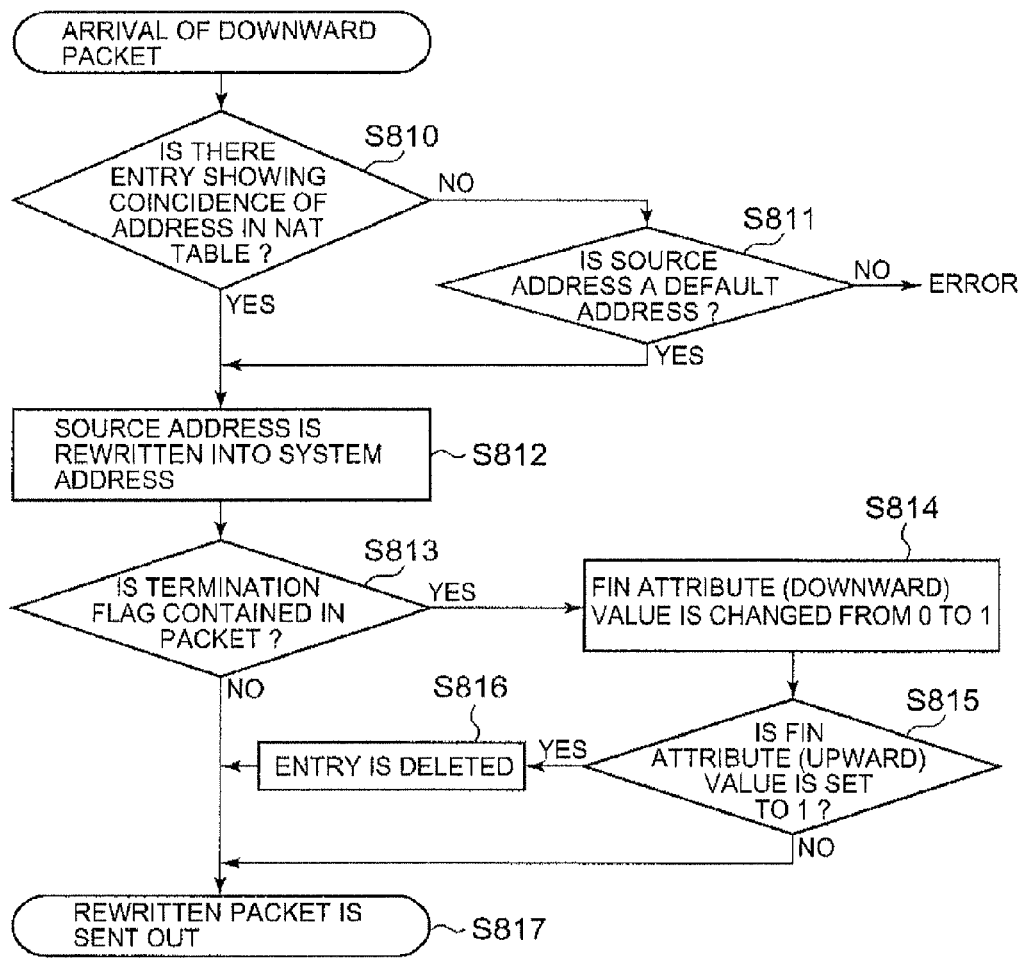
FIG. 23 is a flow chart showing operations of address conversion when a packet is transmitted to a client according to the fifth embodiment of the present invention.

Next, by referring to FIGS. 22 and 23, a flow of processing of address conversion in the switching device 710 is described. FIG. 22 is a flow chart showing operations of address conversion performed when the switching device 710 sends out a packet received from a client to the network 230. As shown in FIG. 22, the switching device 710 having received a packet from a client retrieves an address and client port of the client from the NAT table (Step S800). In this case, the retrieval may be made from the viewpoint of whether or not there is a converting address in each entry in the NAT table 225 showing the coincidence with a source address of the transmitted packet. If there is no entry showing coincidence of addresses ("No" in the Step S800), a destination address of a packet is rewritten into a default address (in this case, into a fixed address of the dispatcher) (Step S802). If there is coincidence of addresses in an entry in the NAT table ("Yes" in the Step S800), the destination address of the packet is rewritten into an converting address of the corresponding entry (Step S802).

Next, whether or not a termination flag (FIN or RESET) is contained in the packet is judged (Step S803). If not ("No" in the Step S803), the rewritten packet is sent out to the network 230 (Step S807).

If the termination flag is contained ("Yes" in the Step S803), the value of the FIN attribute of the entry is changed from 0 to 1 (Step S804). Next, the value of the FIN attribute (downward) of the entry is checked (Step S805). If the FIN attribute (downward) value is 0 ("No" in the Step S805), a packet is transmitted to the local network 230 (Step S807). If the FIN attribute (downward) value is 1 ("Yes" in the Step S805), after the deletion of the entry (Step S806), the packet is transmitted to the local network 230 (Step S807).

FIG. 23 is a flow chart showing operations of address conversion performed when the server 250-1~n or dispatcher 740 transmits a packet via the switching device 710 to a client.

As shown in FIG. 23, the switching device 710 having received a packet from the server 250-1~n or dispatcher 740 checks whether or not there is any one of client addresses and client port numbers in each entry in the NAT table which coincides with a destination address and destination port number of the packet (Step S810). At this time, checking may be made from the viewpoint of whether or not there is any one of converting addresses in each entry in the NAT table which coincides with the source address of the packet.

If there is no coincidence of addresses in any entry in the NAT table ("No" in the Step 810), checking is made as to whether a source address of the packet is a default address (Step S811). If the source address is not the default address, an error occurs and processing of discarding the packet is performed. When the source address is the default address ("Yes" in the Step S811) or when there is coincidence of addresses in an entry ("Yes" in the Step S810), the source address of the packet is rewritten into a system address (Step S812). If the source address is the default address ("Yes" in the Step S811) or there is coincidence of addresses in an entry in the NAT table 225 ("Yes" in the Step S810), the source address of the packet is rewritten into a system address (Step S832).

Next, whether or not a termination flag (FIN or RESET) is contained in the packet is judged (Step S813). If not ("No" in the Step S813), the rewritten packet is sent out to a client (Step S817).

If the termination flag is contained in the packet ("Yes" in the Step S813), the FIN attribute (downward) value in the entry is changed from 0 to 1 (Step S814). Next, the FIN attribute (upward) value is checked (Step S815). When the FIN attribute (upward) value is 0 (No in the Step 815), a packet is transmitted to a client (Step S817). If the FIN attribute (upward) value is 1 ("Yes" in the Step 815), after the deletion of the entry (Step S816), a packet is transmitted to a client (Step S817).

Figure 24:
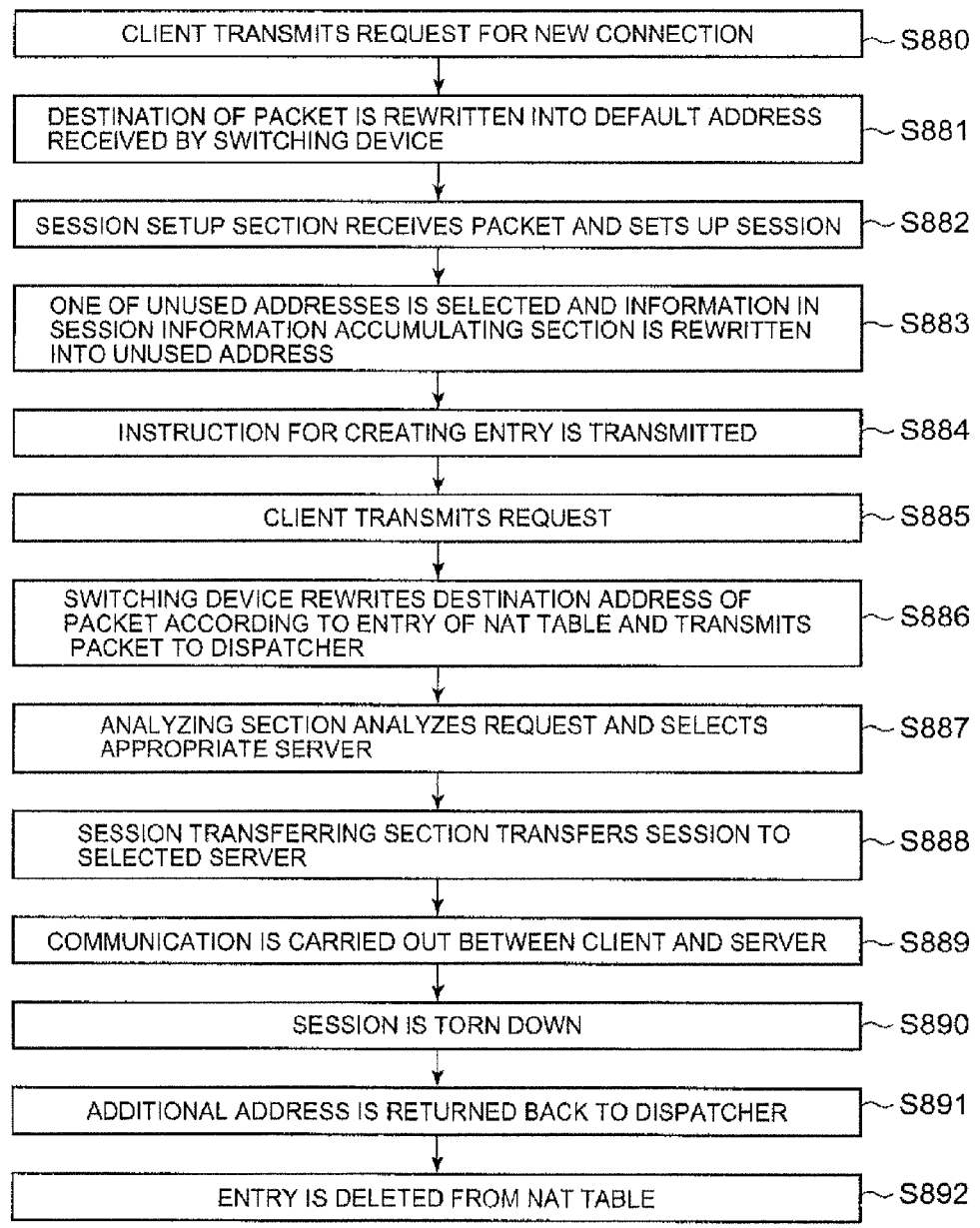
FIG. 24 is a flow chart showing operations from a client's issuance to termination according to the fifth embodiment of the present invention.

FIG. 24 is a flow chart explaining operations from the issuance of a request by a client through the completion of processing of the request between the client and the server or the client and the dispatcher to the termination of a session. The Steps S880 to S885 in FIG. 24 are the same as those in FIG. 8 and, therefore, hereinafter, the Steps S880 to S883 are described and description of the Steps S886 to S892 are omitted accordingly.

When a client transmits a packet containing a request for new session to a device having a system address (Step S880), the switching device 710 having received this packet, as described above, retrieves an entry showing the coincidence of addresses from the NAT table 225. If no entry showing the coincidence of addresses in the NAT table 225 is found out ("No" in the Step S800 in FIG. 22), the switching device 710 rewrites a destination address of the packet into a default address (here, the fixed address of the dispatcher) (Step S881) and sends it out to the network 230. The dispatcher 740 having received the packet containing a request for new session performs processing of setting up a session with a client.

Figure 25:
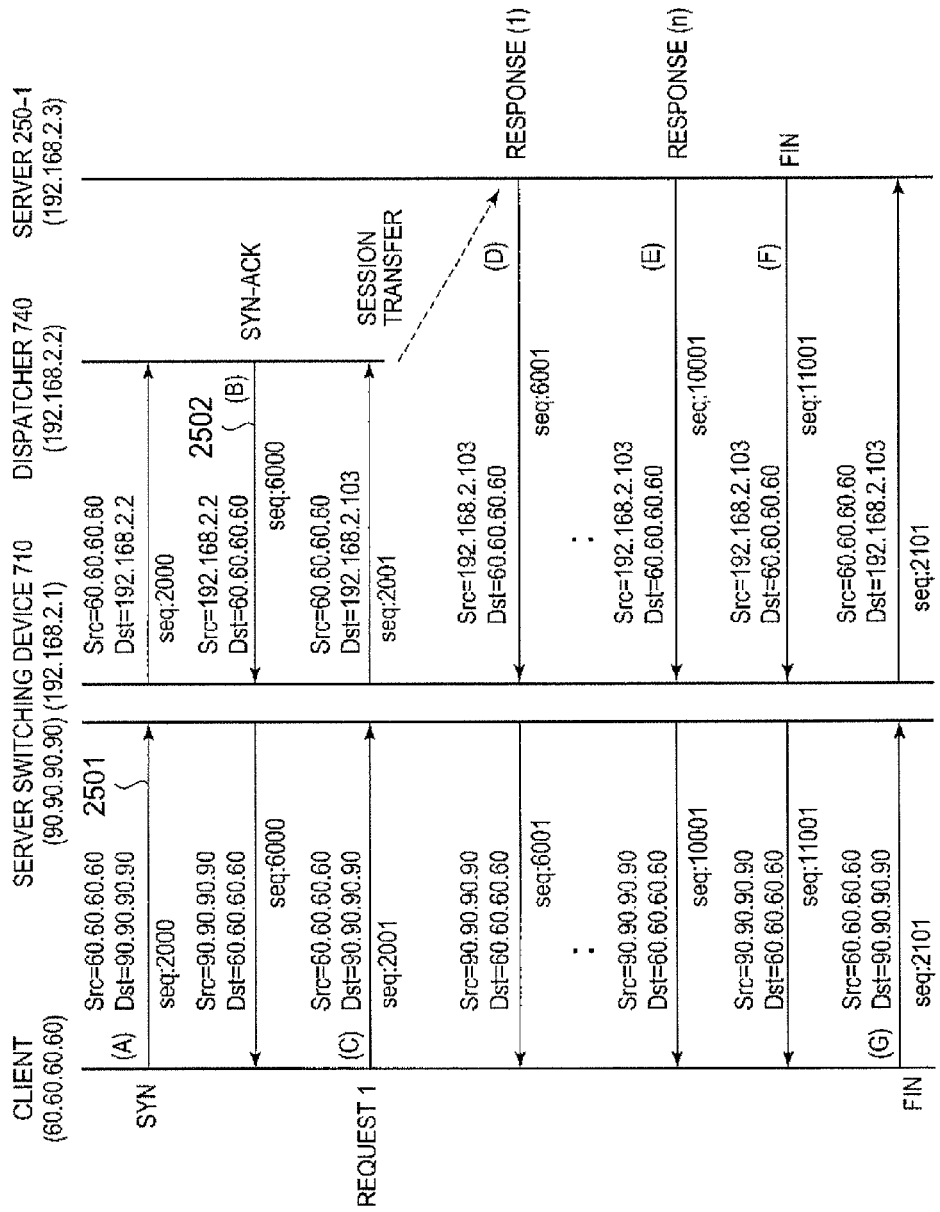
FIG. 25 is a sequence diagram showing examples of specified operations according to the fifth embodiment of the present invention.

When, for example, the TCP/IP protocol is used, the dispatcher 740 transmits a packet having a request for new session (corresponding to (B) SYN-ACK in FIG. 25) to a client. Although the switching device 710 having received the new session request packet retrieves an entry from the NAT table 225, no entry related to the session showing the coincidence of addresses exists in the NAT table ("No" in the Step S810 in FIG. 23). However, since the source address is a default address (fixed address of the dispatcher 740) ("Yes" in the Step S811 in FIG. 23), the source address is rewritten into a system address (Step S812 in FIG. 23) and, after the completion of processing the termination flag (Steps S813 to S816 in FIG. 23), the rewritten packet is transmitted to a client (Step S817 in FIG. 23). Though an acknowledgement packet (though not shown in FIG. 25, this is an ACK packet to be dispatched from a client to the dispatcher 740 for a period between (B) and (C) in FIG. 25) is transmitted from a client, since no entry exists at the time of arrival of the packet to the switching device 710, the packet is transferred to a device having a default address. When the dispatcher receives the ACK packet, the session is set up (Step S882).

After the session is set up, session information containing a client address and fixed address of the dispatcher 740 is created in the session information accumulating section 245. Then, the session information accumulating section 746 selects one of unused addresses and rewrites a fixed address of the dispatcher 740 contained in the session information into the selected unused address (Step S883).

Further, the session information rewriting section 746 transmits an instruction for creating an entry in the NAT table 225, which associates a client address in the established session with the selected additional address to the table entry setting section 727 in the switching device 710 (Step S884).

Then, the client transmits the packet containing the request (Step S885). Since the NAT table entry of a client address in the session and additional address (converting address) exists in the switching device 710 having received the packet, a destination address of the packet transmitted from the client is rewritten into the converting address. As described above, the processes from the Step 886 and thereafter are the same as in the first embodiment in FIG. 9.

FIG. 25 is a sequence diagram showing specified examples of operations in the fifth embodiment configured as above. A flow (see FIG. 9) of packets in the fifth embodiment in FIG. 25 differs from those of packet in the first embodiment in FIG. 9 in that addresses at the following two points are all fixed addresses of the dispatcher 740. The first address is a destination address from the switching device 710 to the dispatcher 740 in the "SYN" packet 2501 in FIG. 25 (A). The second address is a source address from the dispatcher 740 to the switching device 710 in the "SYN-ACK" packet 2502 in FIG. 25 (B). The flow (C) and thereafter in the fifth embodiment in FIG. 25 is the same as the flow (C) and thereafter in the packet flow in the first embodiment in FIG. 9.

Sixth Embodiment

Configurations of the switching system of the sixth embodiment differ from those of the switching device of the fifth embodiment in that the session information rewriting session 746 in the dispatcher 740 is removed from the configurations of the switching system 710 shown in FIG. 21.

In the first embodiment, when a packet containing a termination flag (FIN or RESET) arrives, the address converting section 220 of the switching device 210 deletes a corresponding entry in the NAT table 225. In the sixth embodiment, however, the dispatcher 740 or server 250-1~n provides an instruction for deleting the entry to the switching device 710 at the time of termination of the session.

The configuration of the NAT table 225 of the sixth embodiment is the same as that shown in FIG. 11.

The configuration of the NAT table 225 of the sixth embodiment differs from that of the first embodiment shown in FIG. 3 in that the FIN attributes (upward and downward) are deleted from the table. This is because a termination flag is not detected by the address converting section 220 in the sixth embodiment.

Figure 26:
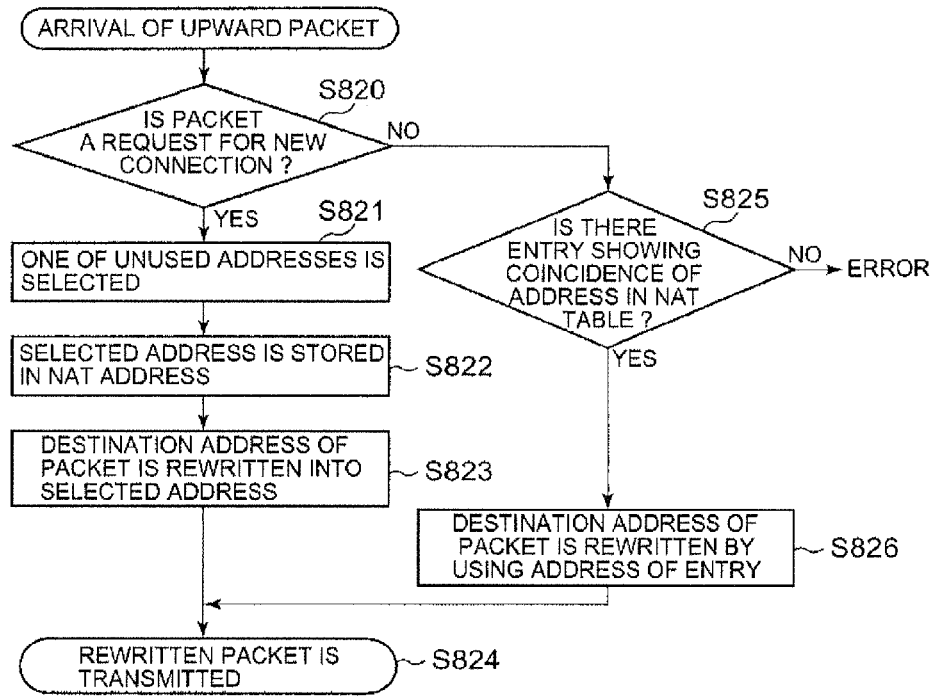
FIG. 26 is a flow chart showing operations of address conversion of a packet received from a client according to the sixth embodiment of the present invention.
Figure 27:
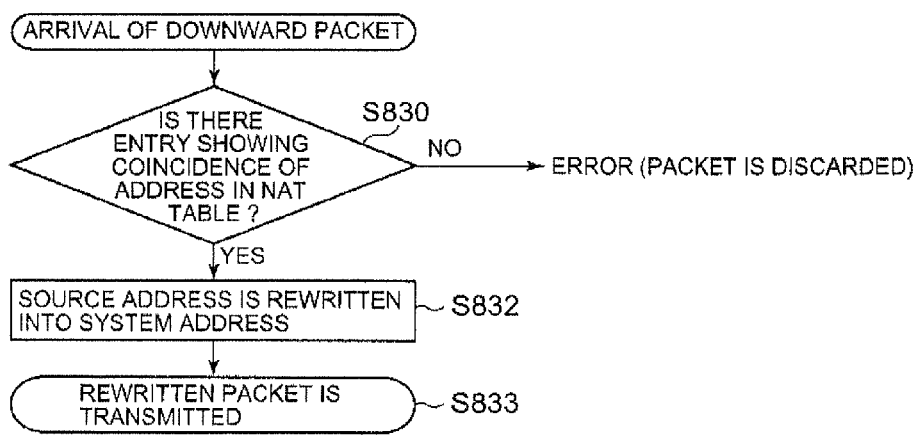
FIG. 27 is a flow chart showing operations of address conversion when a packet is transmitted to a client according to the sixth embodiment of the present invention.

Next, by referring to FIGS. 26 and 27, a flow of processing address conversion in the switching device 710 is described. FIG. 26 is a flow chart explaining operations of address conversion performed when the switching device 710 sends out a packet received from a client to the network 230.

First, operations of the address converting section 220 performed when a packet with a request for new session necessary for a client to set up a session for the first time is transmitted to a device having a system address as a destination are described.

With reference to FIG. 26, the switching device 710 having received a packet from the client-side communicating section 211 judges whether or not the packet is a packet having a request for new session ("Yes" in the Step S820) and selects one of unused addresses being not used (that is, additional address being NOT in communication) in an entry in the NAT table 225 out of addresses being usable as an additional address (Step S821). Any conventional given algorithm can be used as a selection algorithm. An entry is newly created in the NAT table 225 using the address as a converting address. At this time, the address of a client and port number are written as a field value in the entry. Next, a destination address is rewritten into the selected unused address (hereinafter, converting address) (Step S823) and the packet having the rewritten address is transmitted from the server-side communicating section 212 to the network 230 (Step S824).

Next, operations are described which are performed when, after the setup of a session, the packet transmitted from a client is received by the switching device 710 and the destination address is rewritten into a converting address and is transmitted to the network 230.

First, whether or not a packet is a packet showing a request for new session is judged (Step S820). Next, checking is made as to whether or not there is any one of client addresses and client port numbers in each entry in the NAT table 225 that coincide with a destination address and destination port number of the packet (Step S825). When there is no coincidence of addresses in any entry in the NAT table 225 ("No" in the Step S825), the case is judged as the occurrence of an error and processing of discarding the packet is performed. When there is coincidence of addresses in an entry in the NAT table 225 ("Yes" in the Step S825), the destination address of the packet is rewritten into a converting address (Step S826). Then, the packet is transmitted to the local network 230 (Step S824).

FIG. 27 is a flow chart explaining operations of address conversion performed when a packet is transmitted from the server 250-1~n or dispatcher 740 to a client via the switching device 710.

With reference to FIG. 27, the switching device 710 having received a packet from the server 250-1~n or the dispatcher 740 checks whether or not there is any one of client addresses and client port numbers in each entry in the NAT table 225 that coincide with a destination address and destination port number of the packet (Step S830). Checking may be made from the viewpoint as to whether or not there is any one of converting addresses in an entry of the NAT table 225 that coincides with a destination address of the packet.

If there is no coincidence in addresses in any entry in the NAT table 225 (No in the Step S830), an error occurs and processing of discarding a packet is performed. If there is coincidence of addresses in an entry ("Yes" in the Step S830), a destination address of the packet is rewritten into a system address (Step S832) and the packet having the rewritten address is transmitted to a client (Step S833).

Next, a flow from the client's issuance of a request through the completion of processing between the client and server to the termination of a session is described.

The flow of processing operations of the sixth embodiment is almost the same as that of the first embodiment (in FIG. 8). The flow, however, differs in the following point; In the first embodiment, the entry corresponding to the session of the NAT table 225 is deleted by the address converting section 220 by taking the opportunity that the two FIN attributes have become "1" at the Step S490, while, in the sixth embodiment, when the session transferring section 253-1~n of the server 250-1~n or the session transferring section 243 of the dispatcher 740 terminates a session, an instruction for erasing the entry holding correspondence information between a client address used in the session and an additional address (converting address) is provided to the table entry setting section 727 of the switching device 710.

Seventh Embodiment

Configurations of the switching system of the seventh embodiment are the same as those shown in FIG. 21.

In the switching device of the first embodiment, by detecting a flag of a new session request or a termination flag, a NAT table entry is created or deleted respectively. However, in the switching device of the seventh embodiment, without the detection of both the flags, according to an instruction from the dispatcher or the server, the NAT table entry is created or deleted. That is, configurations of the seventh embodiment are equal to a combination of the fifth embodiment and sixth embodiment.

Figure 28:
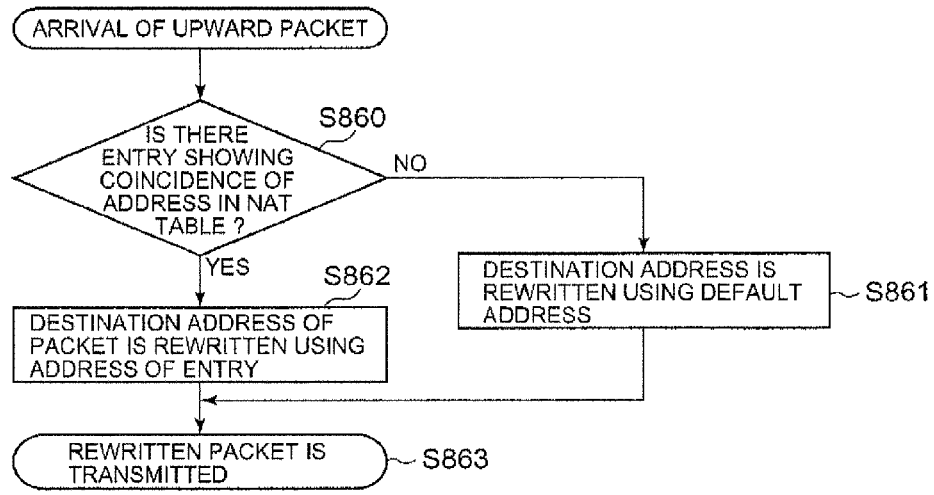
FIG. 28 is a flow chart showing operations of address conversion of a packet received from a client according to the seventh embodiment of the present invention.
Figure 29:
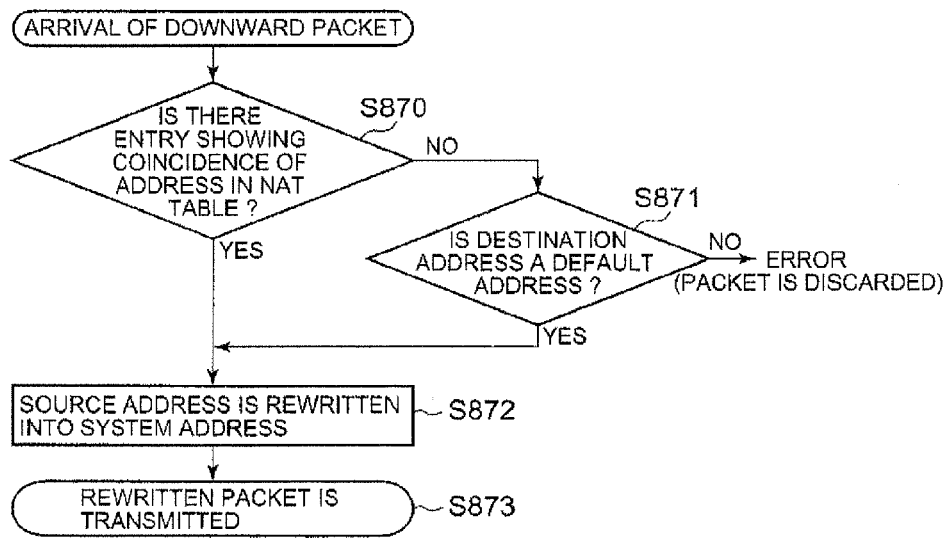
FIG. 29 is a flow chart showing operations of address conversion when a packet is transmitted to a client according to the seventh embodiment of the present invention.

Next, by referring to FIGS. 28 and 29, a flow of operations of address conversion in the switching device 710 is described. FIG. 28 is a flow chart explaining operations of address conversion performed when the switching device 710 transmits the packet received from a client. As shown in FIG. 28, the switching device 710 having received a packet from a client retrieves a client address from the NAT table 255 (Step S860) and, if there is no coincidence of addresses in any entry ("No" in the Step S860), a destination address of the packet is rewritten into a default address (here, address of the dispatcher 740) (Step S861) and the packet having the rewritten address is sent out to the network 230 (Step S863). When the entry containing the client address exists in the NAT table 225, a destination address of a packet is rewritten by using a converting address of the corresponding entry ("Yes" in the Step S862) and the packet having the rewritten address is transmitted to the network 230 (Step S863).

FIG. 29 is a flow chart explaining operations of address conversion performed when the server 259-1~n or dispatcher 740 transmits a packet via the switching device 710 to a client.

As shown in FIG. 29, the switching device 710 having received a packet from the server 250-1~n or from the dispatcher 740 checks whether or not there is any one of client addresses and client port numbers in each entry in the NAT table 225 that coincides with a destination address and destination port number of the packet (Step S870). In this case, checking may be made from the viewpoint of whether or not there is any one of converting addresses in each entry in the NAT table 225 that coincides with a source address of the transmitted packet.

If there is no coincidence of addresses in an entry in the NAT table 225 ("No" in the Step S870), whether or not a source address of the packet is a default address is checked (Step S871). If the source address is not the default address ("Yes" in the Step S870), an error occurs and processing of discarding the packet is performed. If the source address is the default address ("Yes" in the Step S870) or if there is coincidence of addresses in an entry in the NAT table ("Yes" in the Step S870), a source address of the packet is rewritten into a system address (Step S872) and the packet having the rewritten address is transmitted to a client (Step S873).

Next, a flow from the issuance of a request by a client via the processing between the client and server to the termination of the session is explained.

The flow of processing operations of the seventh embodiment is almost the same as that of the fifth embodiment (in FIG. 24). The flow, however, differs in the following point; In the fifth embodiment, the address converting section 220 deletes the entry by taking the opportunity that the two FIN attributes have become "1" at the Step S892, while, in the seventh embodiment, when the session transferring section 243 of the server 250-1~n or the dispatcher 740 terminates a session, an instruction for erasing the entry holding correspondence information between a client address used in the session and an additional address (converting address) is provided to the table entry setting section 727 of the switching device 710.

Although, in all embodiments described above, operations of transferring a session between a client and servers are described, the role of the client or server is not fixed.

Any general communication devices may be employed as the client or server described in the above embodiments. For example, the above embodiments can be applied to a system in which both the servers and client are an IP telephony and inquiries from clients are assigned by the IP telephony ("client" in the above embodiment) of a client to a plurality of pieces of IP telephony (server in the above embodiment) of operators.

Moreover, in the above embodiments, although the dispatcher is provided independently from the switching device and servers, the dispatcher may be mounted integrally with the switching device or with the server.

The above explanation is simply an example of the preferred embodiments of the present invention and the present invention is not limited to this. It will be readily understood that changes and modifications may be made without departing from the spirit and scope of the invention.

INDUSTRIAL APPLICABILITY

According to the present invention, by using the method of transferring a session in packet communication among communicating devices and by switching a communication device to be connected, efficient communication can be achieved. By switching a plurality of servers using the switching device, communication systems in a data center in particular can be properly and efficiently operated.

The invention claimed is:

1. A dispatcher comprising a session setup section to set up, when a packet destined for a specified address is a request for new session, a session with a first communication device being a source of a packet, a session information rewriting section to select an address to be assigned to the setup session from unused addresses and to provide the selected address to a converting table, and a session transferring section to transfer said setup session and the selected address to a second communication device,
    wherein the selected address is deleted after the setup session is transferred to the second communication device, and
    wherein said session transferring section provides, when a session between said second communication device and said first communication device is terminated, an instruction for deletion of an entry corresponding to said session.

2. Servers each comprising a session transferring section to take over, by receiving information about a session setup between a first communication device and a session setup section, being possessed by said session setup section, a session with said first communication device from said session setup section and having a function of rewriting a source address to be transmitted to said first communication device into a system address, in a network system having said system address representing a plurality of servers,
    wherein the received information about the session setup includes an address assigned to the session setup between the first communication device and the session setup section, and
    wherein the address assigned to the session setup is deleted after the session transferring section takes over the session, and
    wherein said session transferring section provides, when a session between a server and said first communication device is terminated, an instruction for deletion of an entry corresponding to said session from a converting table of an address in a switching device of a network system.

* * * * *